(12) United States Patent
Baik et al.

(10) Patent No.: US 10,726,836 B2
(45) Date of Patent: Jul. 28, 2020

(54) PROVIDING AUDIO AND VIDEO FEEDBACK WITH CHARACTER BASED ON VOICE COMMAND

(71) Applicant: KT CORPORATION, Gyeonggi-do (KR)

(72) Inventors: Song-Yee Baik, Gyeonggi-do (KR); Joo-Hyun Lee, Seoul (KR); Eun-Kyung Kwak, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 0 days.

(21) Appl. No.: 15/676,974

(22) Filed: Aug. 14, 2017

(65) Prior Publication Data
US 2018/0047391 A1    Feb. 15, 2018

(30) Foreign Application Priority Data

Aug. 12, 2016  (KR) .................. 10-2016-0103272
Jan. 16, 2017  (KR) .................. 10-2017-0007477
Apr. 21, 2017  (KR) .................. 10-2017-0051761

(51) Int. Cl.
| | | |
|---|---|---|
| *G10L 15/22* | (2006.01) | |
| *G10L 21/10* | (2013.01) | |
| *G06F 3/16* | (2006.01) | |
| *H04N 21/422* | (2011.01) | |
| *H04N 21/44* | (2011.01) | |

(Continued)

(52) U.S. Cl.
CPC .............. *G10L 15/22* (2013.01); *G06F 3/167* (2013.01); *G06T 13/40* (2013.01); *G10L 15/1815* (2013.01); *G10L 21/10* (2013.01); *G10L 25/57* (2013.01); *H04N 21/42203* (2013.01); *H04N 21/4396* (2013.01); *H04N 21/44* (2013.01); *G10L 25/63* (2013.01); *G10L 2015/223* (2013.01); *G10L 2015/225* (2013.01); *G10L 2021/105* (2013.01)

(58) Field of Classification Search
CPC ... H05K 999/99; H04W 12/06; G10L 15/265; G10L 15/22; G06F 17/289
See application file for complete search history.

(56) References Cited

U.S. PATENT DOCUMENTS 5,777,614 A * 7/1998 Ando .................... G06F 3/0481
715/729
6,570,555 B1 * 5/2003 Prevost .................... G06F 3/01
345/156

(Continued)

FOREIGN PATENT DOCUMENTS

| CN | 105046238 | * 11/2015 | ............... G06K 9/00 |
|---|---|---|---|
| JP | 08-166866 A | 6/1996 | |

(Continued)

*Primary Examiner* — Paras D Shah
(74) *Attorney, Agent, or Firm* — IP Legal Services, LLC

(57) ABSTRACT

Provided are methods of dynamically and selectively providing audio and video feedbacks in response to a voice command. A method may include recognizing a voice command in a user speech received through a user device, generating at least one of audio data and video data by analyzing the voice command and associated context information, and selectively outputting the audio data and the video data through at least one of a display device and a speaker coupled to a user device based on the analysis result.

19 Claims, 19 Drawing Sheets

(51) Int. Cl.
   *H04N 21/439* (2011.01)
   *G10L 25/57* (2013.01)
   *G10L 25/63* (2013.01)
   *G10L 15/18* (2013.01)
   *G06T 13/40* (2011.01)

(56) References Cited

U.S. PATENT DOCUMENTS

| | | | |
|---|---|---|---|
| 6,570,588 B1 | 5/2003 | Ando et al. | |
| 7,426,467 B2* | 9/2008 | Nashida | G06F 3/16 348/E7.061 |
| 9,199,122 B2* | 12/2015 | Kaleal, III | A61B 5/4872 |
| 9,691,221 B2* | 6/2017 | Block | G07F 17/3239 |
| 2002/0108110 A1 | 8/2002 | Wugofski | |
| 2002/0111794 A1* | 8/2002 | Yamamoto | G10L 13/08 704/200 |
| 2003/0220799 A1* | 11/2003 | Kim | G10L 15/22 704/277 |
| 2007/0120959 A1* | 5/2007 | Wu | G01R 31/3648 348/14.02 |
| 2008/0183678 A1* | 7/2008 | Weston | G06F 17/30699 |
| 2010/0057644 A1 | 3/2010 | Barton et al. | |
| 2010/0153868 A1* | 6/2010 | Allen | G06T 13/40 715/764 |
| 2011/0201414 A1* | 8/2011 | Barclay | G07F 17/3206 463/25 |
| 2011/0288868 A1* | 11/2011 | Lloyd | H04M 1/271 704/251 |
| 2012/0022874 A1 | 1/2012 | Lloyd et al. | |
| 2012/0262296 A1 | 10/2012 | Bezar | |
| 2012/0278076 A1 | 11/2012 | Lloyd et al. | |
| 2013/0035790 A1* | 2/2013 | Olivier, III | G05D 1/0246 700/246 |
| 2013/0325466 A1* | 12/2013 | Babin | H04N 21/482 704/235 |
| 2014/0143809 A1* | 5/2014 | Sung | H04N 21/64322 725/37 |
| 2014/0278403 A1* | 9/2014 | Jacob | G06F 3/01 704/235 |
| 2015/0217199 A1* | 8/2015 | Cotter | A63F 13/86 463/31 |
| 2015/0256873 A1* | 9/2015 | Klein | H04N 21/26283 725/39 |
| 2015/0290795 A1* | 10/2015 | Oleynik | G05B 19/42 700/257 |
| 2015/0379752 A1* | 12/2015 | Li | G06T 13/40 715/752 |
| 2016/0034458 A1* | 2/2016 | Choi | G10L 15/06 704/251 |
| 2016/0140960 A1 | 5/2016 | Chae | |
| 2016/0174074 A1* | 6/2016 | Kim | H04W 12/06 455/411 |
| 2016/0210602 A1* | 7/2016 | Siddique | G06Q 20/0453 |
| 2016/0328014 A1* | 11/2016 | Huang | G06F 3/011 |
| 2016/0381202 A1* | 12/2016 | Koo | G04M 1/72533 455/559 |
| 2017/0206797 A1* | 7/2017 | Solomon | G09B 7/08 |
| 2017/0236512 A1 | 8/2017 | Williams et al. | |
| 2017/0264954 A1* | 9/2017 | Nakagawa | H04N 21/44218 |
| 2018/0018793 A1* | 1/2018 | Min | G06T 11/001 |
| 2018/0019000 A1* | 1/2018 | Delpuch | H04N 9/87 |
| 2018/0054612 A1* | 2/2018 | Kim | G09G 5/003 |
| 2018/0067381 A1* | 3/2018 | Aflatooni | G03B 17/50 |

FOREIGN PATENT DOCUMENTS

| | | |
|---|---|---|
| JP | 10-020884 A | 1/1998 |
| JP | 2004-005530 A | 1/2004 |
| JP | 2006-317722 | 11/2006 |
| JP | 2014-191272 A | 10/2014 |
| JP | 2015-060391 A | 3/2015 |
| KR | 10-0331033 B1 | 4/2002 |
| KR | 10-0644027 B1 | 11/2006 |
| KR | 10-0768653 B1 | 10/2007 |
| KR | 10-2008-0099883 A | 11/2008 |
| KR | 10-2009-0092946 A | 9/2009 |
| KR | 10-0955247 B1 | 4/2010 |
| KR | 10-2011-0059178 A | 6/2011 |
| KR | 10-2013-0113307 A | 10/2013 |
| KR | 10-2013-0137332 A | 12/2013 |
| KR | 10-1339684 B1 | 12/2013 |
| KR | 10-2014-0066025 A | 5/2014 |
| KR | 10-2016-0011620 A | 2/2016 |
| KR | 10-2016-0014926 A | 2/2016 |
| KR | 10-2016-0058523 A | 5/2016 |
| KR | 10-2016-0071111 A | 6/2016 |

* cited by examiner

FIG. 9
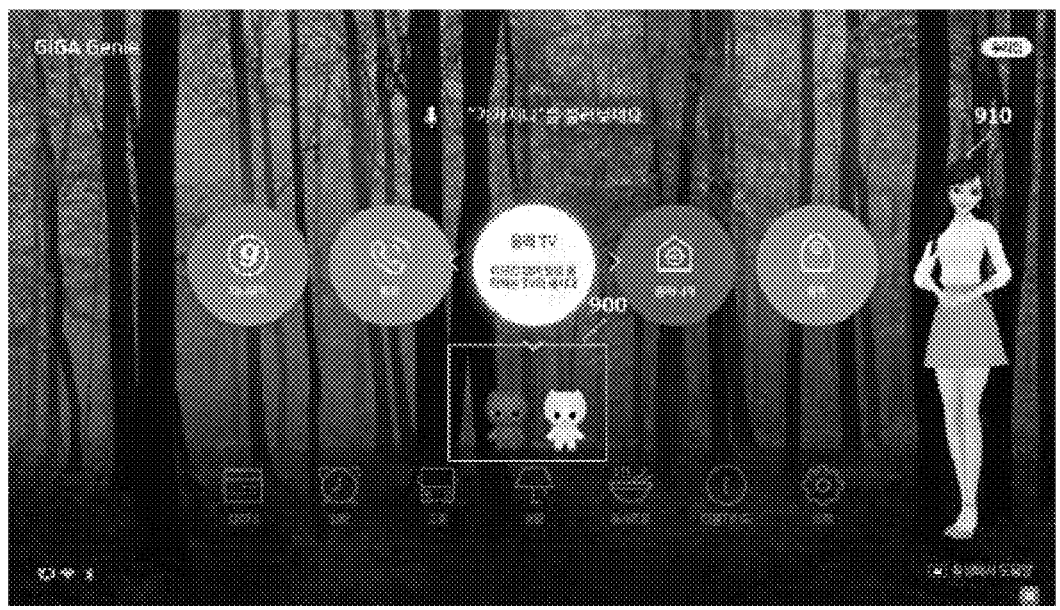
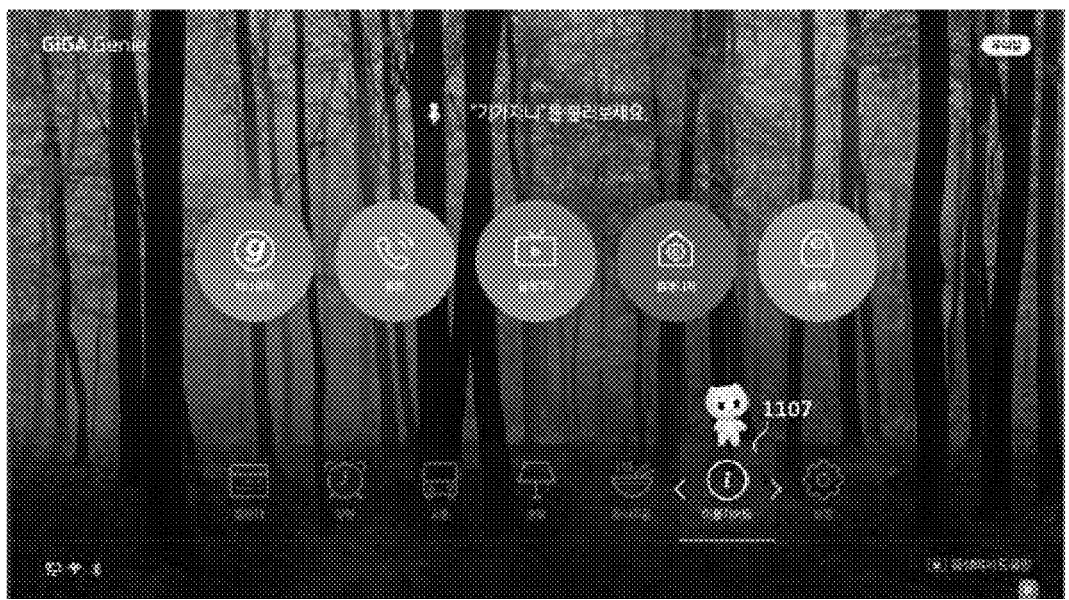

FIG. 10
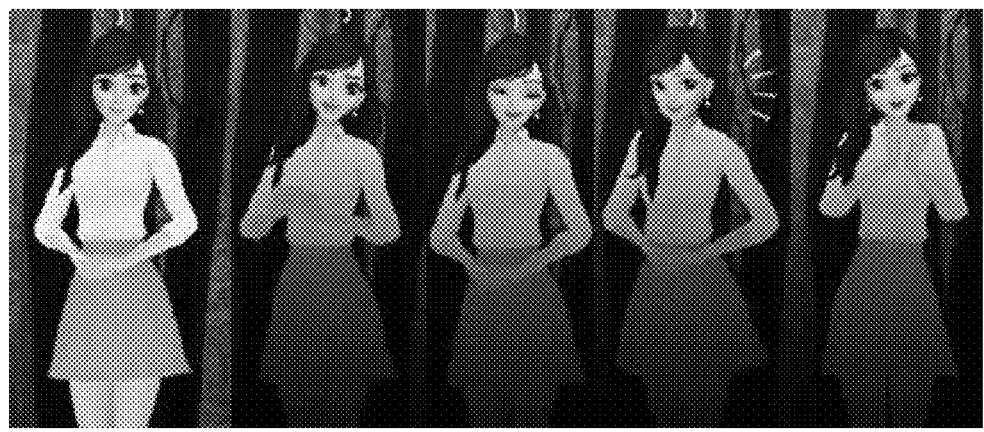
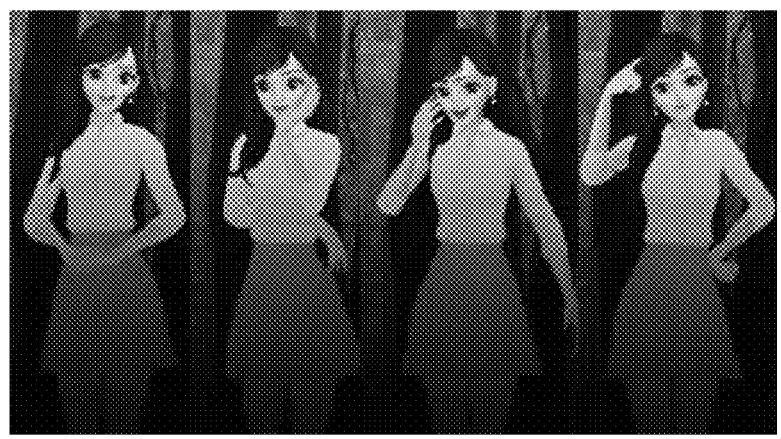

Default facial expression (a)    First facial expression (b)    Second facial expression (c)

< positive form: Y axis variation >

<Question form: Z axis variation>

<Negative form: Z axis rotation>

PROVIDING AUDIO AND VIDEO FEEDBACK WITH CHARACTER BASED ON VOICE COMMAND

CROSS REFERENCE TO PRIOR APPLICATIONS

The present application claims priority under 35 U.S.C. § 119 to Korean Patent Application No. 10-2016-0103272 (filed on Aug. 12, 2016), Korean Patent Application No. 10-2017-0007477 (fined on Jan. 16, 2017), and Korean Patent Application No. 10-2017-0051761 (filed on Apr. 21, 2017).

The subject matter of this application is related to U.S. patent application Ser. No. 15/641,843 filed Jul. 5, 2017, the teachings of which are incorporated herein their entirety by reference.

BACKGROUND

The present disclosure relates to artificial intelligent voice interactive services, and more particularly, to dynamically and selectively providing audio and video feedbacks in response to user speech while performing tasks in response to voice commands in the user speech.

Due to advances in speech recognition technology, major electronics manufacturers have introduced many voice interactive electronic devices capable of performing tasks in response to user's voice command. Through such voice interactive electronic devices, a user may perform tasks and be provided with the task results with feedbacks. However, the feedbacks and the task results have been limited to audio feed bank or a voice answer.

SUMMARY

In accordance with an aspect of the present embodiment, an artificial intelligence voice interactive system may recognize a voice command from user speech, perform associated tasks, and selectively provide audio and video feedback using various user interfaces including a display unit and speakers.

In accordance with another aspect of the present embodiment, an artificial intelligence voice interactive system may perform various tasks based on recognized voice commands in user speech and selectively provide a user with audio and video results with characters tailed and dynamically changed according to at least one of the voice commands, a task to perform, and associated context information.

In accordance with still another aspect of the present embodiment, a user device and a method for providing an artificial intelligent voice interactive service with various characters each having different facial expressions and actions customized to a user or a voice command.

In accordance with yet another aspect of the present embodiment, a user device and a method for providing artificial intelligent voice interactive service may be provided for dynamically creating and providing various of characters with different actions and facial expressions according to a service type.

In accordance with yet another aspect of the present embodiment, a user device and a method for i) analyzing characters, ii) collecting emotion, action, and sentence information associated with facial expressions, actions, and sentence types of the characters, and iii) updating tag information of the characters with the collected information in order to provide more and accurately customized characters to a user or a voice command.

In accordance with at least one embodiment, a method may be provided for dynamically providing audio and video feedback in response to a voice command through an artificial intelligence voice interactive system including a user device, a central server, a speech recognition server, an artificial intelligent answering server, and a character generating server. The method may include recognizing a voice command in a user speech received through a user device; generating at least one of audio data and video data by analyzing the voice command and associated context information; and selectively outputting the audio data and the video data through at least one of a display device and a speaker coupled to a user device based on the analysis result.

The generating may include generating a user interface (UI) as the video data upon receipt of the voice command and displaying the generated UI through the display device.

The generating may include generating the audio data and the video data by at least one of i) reproducing audio or video contents, ii) generating a user interface (UI), iii) receiving a broadcasting signal from an external entity according to a service type determined based on the voice command; and selectively outputting the generated audio data and the generated video data through at least one of a display device and a speaker coupled to a user device according to the service type determined based on the voice command.

The selectively outputting may include determining a task type based on the analysis result; determining whether a service type to be provided in response to the determined task type is an audio service, a video based service, and a user interface (UI) service based on the analysis result; and differently and selectively outputting the generated audio data and the video data according to the determined service type.

The selectively outputting may include, i) when a service type of the voice command is a video based service, outputting both of the generated audio data and the generated video data through the display and the speaker, ii) when a service type of the voice command is an audio service, outputting the generated audio data through the speaker; and iii) when a service type of the voice command is a user interface (UI) service, generating, as the video data, a UI for interacting with a user and displaying the generated UI through the display device.

The selectively outputting may include displaying the generated video data of the voice command while displaying previously generated video data of a previous voice command in an overlapping manner.

The selectively outputting may include, when a service type associated with the voice command is an audio service while outputting a video data in response to a previous voice command, performing at least one of: i) generating a new audio data in response to the voice command; ii) pausing the outputting of the video data of the previous voice command; iii) playing back the new audio data; and iv) resuming the outputting of the video data of the previous voice command.

The selectively outputting may include, when a service type associated with the voice command is an audio service while outputting a video data in response to a previous voice command, performing at least one of: i) generating a new audio data in response to the voice command; ii) continuing the outputting of the video data of the previous voice command; iii) muting a volume of the outputting of the video data of the previous voice command; iv) playing back the new audio data; and v) resuming the volume of the outputting of the video data of the previous voice command.

The selectively outputting may include, when a service type associated with the voice command is a user interface (UI) service while outputting a video data in response to a previous voice command, performing at least one of: i) generating a user interface (UI) data in response to the voice command; and ii) outputting the UI data over the outputted video data of the previous voice command in an overlapping manner.

The method may further include iii) generating an audio data corresponding to the generated UI data in response to the voice command; iv) pausing a volume of the outputting of the video data of the previous voice command; v) outputting the generated audio data; and vi) resuming the volume of the outputting of the video data of the previous voice command after completely outputting the generated audio data.

The method may further include determining a mode of providing the audio data and the video data based on a predetermined mode condition; in case of a graphic user mode, outputting both of the audio data and the video data in response to the voice command; and in case of an audio user mode, outputting the audio data only in response to the voice command.

The predetermined mode condition for selecting the graphic user mode may include detecting a signal indicating that the display unit is coupled to at least one of the user device, the central server, and the character generating server; determining that the graphic user mode is previously selected by a user; receiving a voice command requiring a video service; and receiving a task result requiring a video service.

The method may further include generating a character having a facial expression and an action tailored to the voice command and associated context information; and selectively outputting the generated character according to the analysis result.

The generating may include determining at least one of a sentence type, an emotion type, and an action type of a character to be generated based on the analysis result.

The generating may include generating the facial expression and the action of the character based on a sentence type, an emotion type, and an action type, which are determined based on the analysis result.

The generating may include selecting at least one of character elements based on at least one of a sentence type, an emotion type, and an action type, which are determined based on the analysis result; and generating the character by combining the selected at least one of character elements.

The at least one of character elements may be selected from a character database having reference facial expressions and reference actions, which are classified by and mapped to at least one of sentence types, emotion types, and action types.

The method may further include reproducing the generated character with the facial expression and the action in a reference size; collecting emotion information, action information, and sentence type information from the reproduced character; and updating the character database by storing tag information of the reproduced character to include the collected emotion information, action information, and sentence type information.

In accordance with at least one embodiment, a method may be provided for dynamically providing audio and video feedback in response to a voice command through an artificial intelligence voice interactive system. The method may include generating an audio data for an audio service, a video data for a video based service, and a user interface (UI) data for a UI based service in response to a voice command; and selectively outputting the generated audio data, the video data, and the UI data according to a service type determined based on the voice command and associated context information, wherein the UI data includes data for at least one of a graphic user interface and a character having a facial expression and an action, which are tailored based on the voice command and the associated context information.

In accordance with at least one embodiment, a method may be provided for dynamically providing audio and video feedback in response to a voice command through an artificial intelligence voice interactive system. The method may include generating an audio data for an audio service, a video data for a video based service, and a user interface (UI) data for a UI based service in response to a voice command, and selectively outputting the generated audio data, the video data, and the UI data according to a service type determined based on the voice command and associated context information, The UI data may include data for at least one of a graphic user interface and a character having a facial expression and an action, which are tailored based on the voice command and the associated context information.

The analyzing may include determining emotion type information based on a facial expression of the reproduced character, determining action type information based on an action of the reproduced character, and determining sentence type information based on head movement directions of the reproduced character.

The determining the emotion type information may include determining first emotion information based on emotion properties mapped to a reference facial expression associated with the reproduced character, determining second emotion information based on a time period for maintaining the facial expression of the reproduced character, and determining the emotion type information of the reproduced character based on the first emotion information and the second emotion information.

The determining of the first emotion information includes comparing a facial expression of the reproduced character with reference facial expressions stored in the character database, selecting one having most similar facial expression from the reference facial expressions based on the comparison result, determining a movement amount of each representative facial part in the reproduced character, comparing the determined movement amounts of the representative facial parts with those in the selected reference facial expression, and determining whether the difference therebetween is within a predetermined threshold range.

When the difference is within a predetermined threshold range, the method may further include selecting the facial expression of the reproduced character as a reference facial expression for the reproduced character, and determining at least one of emotion properties mapped to the reference facial expression as first emotion information of the reproduced character.

The determining action type information may include determining first action information based on position variations of representative facial parts and predetermined facial part weights and determining second action information based on position variation of representative body parts and predetermined body part weights.

The determining sentence type information may include determining a movement direction of a head of the reproduced character based on an x-axis, a y-axis, and a z-axis; when the movement direction is from the z-axis to the y-axis, determining the sentence type information as a positive form; when the movement direction is from the z-axis to the x-axis, determining the sentence type information as a question form; when the movement direction is rotation based on the z-axis, determining the sentence type information as a negative form; otherwise, determining the sentence type information as a narrative form.

The updating may include generating tag information of the reproduced character based on the determined emotion type information, action type information, and sentence type information; and storing the generated information as a tag of the reproduced character.

The tag includes information on: identification of a character, emotion properties as first emotion information, emotion strength as second emotion information, properties associated to position variations of representative body parts as first action information, properties associated to position variations of representative facial parts as second action information, and a sentence type.

The character database may include at least one of: reference facial expressions each represents a corresponding emotion property; movement amount values of representative facial parts; position information of each representative facial part in a reference facial expression; a weight value of each representative facial part in the reference facial expression; a reference emotion value calculated by adding up all the weight value of the representative facial part; emotion properties each predetermined and mapped to a corresponding reference emotion value; and emotion strength information used to determine an emotion strength of a character.

BRIEF DESCRIPTION OF THE DRAWINGS

FIG. 8 and FIG. 9 illustrate exemplary graphic user interfaces displayed as a result of performing a task requested by a voice command in accordance with at least one embodiment;

FIG. 10 illustrates selecting facial expressions and actions based on at least one of a sentence type, an emotion type, and an action type, which are determined based on voice command and a task result, in accordance with at least one embodiment.

DETAILED DESCRIPTION OF EMBODIMENTS

Figure 1:
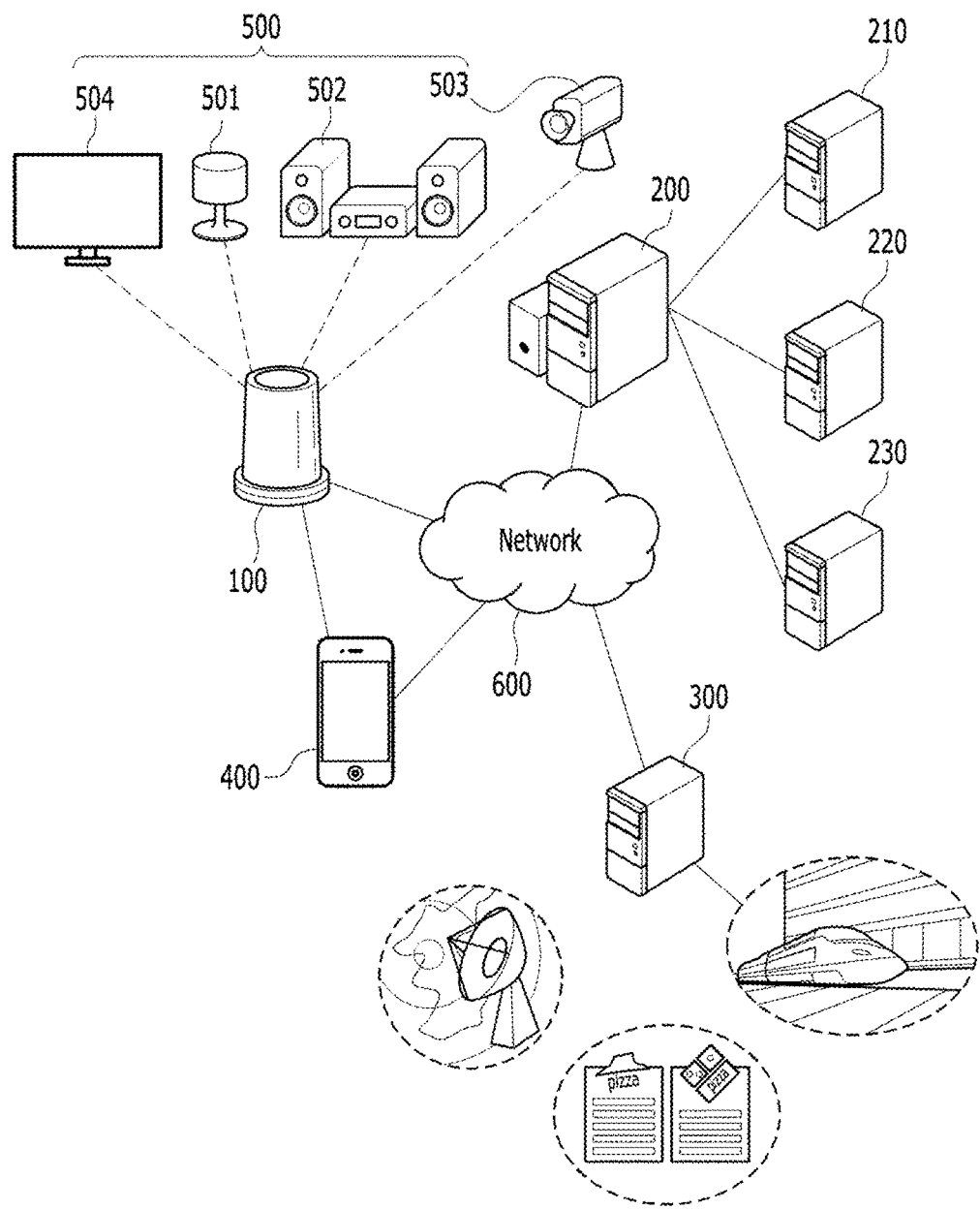
FIG. 1 illustrates an artificial intelligence voice interactive system in accordance with at least one embodiment.

In accordance with at least one embodiment, an artificial intelligence voice interactive system may provide various audio and video feedbacks (e.g., audio service and video based service, or a voice answer and a video answer with a graphic user interface) in response to a voice command in user speech. The various audio and video feedbacks include a voice answer, a sound effect, a graphic user interface, characters, text, and animated messages, and so forth. In particular, the artificial intelligence voice interactive system may dynamically create and provide a graphic user interface with tailed characters each having unique actions and facial expressions in response to voice commands included in a user speech.

For example, the artificial intelligence voice interactive system may i) recognize at least one voice command from user speech, ii) determine at least one task in the voice command, iii) dynamically generate audio and video feedback, such as graphic user interfaces with various characters with different actions and facial expressions in response to the recognized voice command, and vi) selectively provide audio and video feedbacks with the generated characters through at least one devices.

In particular, according to predetermined conditions, an audio feedback and a video feedback may be selectively provided. For example, at least one of au audio feedback only, a video feedback only, and audio and video feedback together may be provided according to a previous service type (an audio service, a video based service, a user interface UI based service), a current service type (an audio service, a video based service, a user interface UI based service), a display device status, an audio device status, and likes. Furthermore, a character may be automatically and dynamically generated to have various facial expressions and actions according to emotion information, action information, and sentence type information included in the voice command in accordance with at least one embodiment. Such a generated character may be displayed with a predetermined graphic user interface in accordance with at least one embodiment.

In accordance with at least one embodiment, to more accurately and dynamically generate a character to have facial expressions and actions tailored to a user (e.g., voice command), previously generated characters may be analyzed, and the analysis result may be accumulated into a database. In particular, i) the generated and displayed character may be reproduced in a reference size and re-analyzed, ii) information on emotion type, action type, and sentence type may be extracted therefrom, and iii) a character database may be updated based on the extracted information. Since the character database may be updated continuously, more accurately customized characters may be generated and provided in response to a user and a voice command.

In order to provide such artificial intelligence voice interactive services and tasks, the artificial intelligence voice interactive system may include a user device, a central server coupled to at least one of a speech recognition server, an artificial intelligent (AI) answering server, and a character generating server, and a service server connected to related legacy system. Such a system will be described in more detail with reference to FIG. 1.

FIG. 1 illustrates an artificial intelligence voice interactive system in accordance with at least one embodiment. Referring to FIG. 1, the artificial intelligence voice interactive system may include user device 100, central server 200, and service server 300 in accordance with at least one embodiment. In particular, central server 200 may be coupled to speech recognition server 210, AI answering server 220, and character generating server 230. For convenience and ease of understand, central server 200 is illustrated as including three independent servers 210, 220, and 230 for performing operations for selectively providing audio and video feedbacks in response to a voice command, for dynamically and automatically creating a character with different facial expressions and actions in response to a voice command, and for collecting information on a provide character and updating a database based on the collected information. However, the embodiments of the present disclosure are not limited thereto. For example, central server 200 may be integrally implemented as a single stand-alone server for performing all the functions included in speech recognition server 210, AI answering server 220, and character generating server 230. Further. Central server 200 may include a group of computer servers each having dedicated functions. Such central server 200 will be described in more detail below.

User device 100 may listen to speech made around thereof, recognize at least one voice command from the speech, and transfer the recognized voice command to central server 200. Such user device 100 is an electronic device that i) includes at least one processor, a memory, and a communication circuit and ii) is capable of performing various operations for listening to speech, recognizing at least voice command from the speech, transferring the recognized command to other devices through communication network 600, and controlling Internet of Thing (IoT) devices 500 in response to a voice command. For example, user device 100 may include a smart phone, a notebook computer, a tablet personal computer (PC), a smartwatch, and a desktop computer. However, the embodiments of the present disclosure are not limited thereto. User device 100 may be any electronic device including at least one processor, a memory, and a communication circuit for performing the above-mentioned tasks, such as recognizing voice commands and transferring the voice commands to central server. In addition, user device 100 may be designed and manufactured dedicatedly for providing voice interactive services in response to user command using artificial intelligence voice interactive technology. Further, such user device 100 may be produced as software program codes and installed in other devices, but the present embodiments are not limited thereto. In addition, user device 100 may be controlled in cooperation with user equipment 400 installed with a companion application (App). In this case, user device 100 may communicate with user device 400 and provide a graphic user interface (GUI) to a user through user equipment 400 for controlling user device 100. For example, user equipment 400 may be a smart phone installed with a predetermined companion app to control user device 100. However, the embodiments of the present disclosure are not limited thereto.

For example, user device 100 may be installed or deployed at a predetermined location, as a stationary device and connected to a communication network for communicating with other entities such as Internet of Things (IoT) devices 500, smart phone 400 of a user, central server 200, and service servers 300. However, user device 100 may be a portable device carried with a user. After user device 100 is turned on (powered on), user device 100 may always listen to sound or speech generated within a predetermined area. User device 100 may recognize at least one voice command from the sound or speech. For example, user device 100 recognizes a voice command when user device 100 detects a predetermined word (e.g., a wake-up word or initiation word) in the speech. User device 100 may recognize a certain length of a speech after the wake-up word as a voice command, record it, and store it as a certain format of data.

User device 100 may generate a message including information (e.g., certain format of binary data) on the recognized voice commands (e.g., user speech recorded in a certain data format) and transmit the generated message to central server 200 through communication network 600. The information may include text data or audio data of the recognized voice command. In addition, user device 100 may packetize supplementary information into the message, such as user identification information, device identification information, and so forth. The supplementary information may be context data (e.g., current status of user device or surroundings thereof).

Figure 7:
FIG. 7 illustrates exemplary characters created and displayed in response to a voice command in accordance with at least one embodiment.
Figure 8:
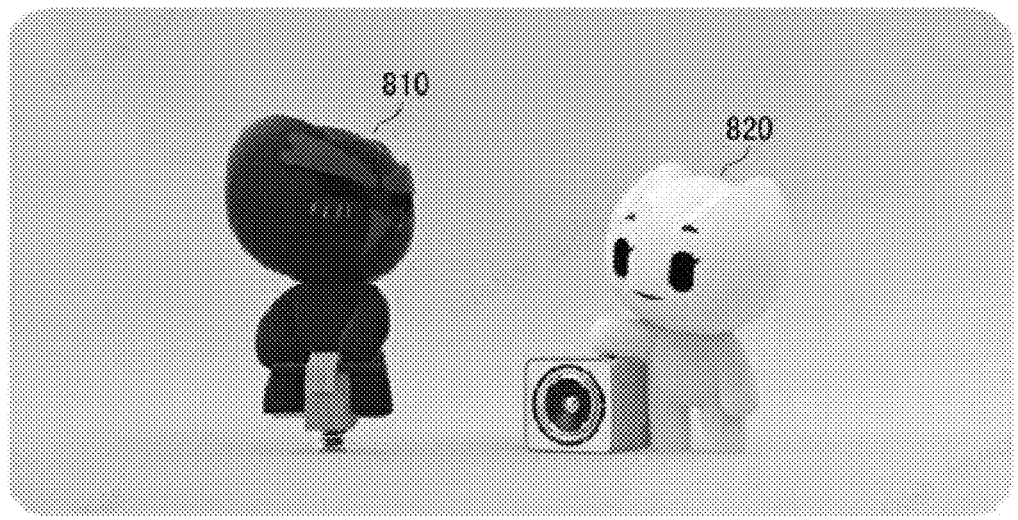

User device 100 may selectively output audio and video feedbacks in response to user speech in accordance with at least one embodiment. For example, user device 100 may receive an audio and video data from central server 200 to selectively output audio and video feedback (e.g., a result of task performed in response to the voice command). Such an audio and video data may include information for generating a graphic user interface (GUI) with a selected character having a tailored facial expression and actions and a corresponding voice answer. For example, FIG. 7 and FIG. 8 illustrate exemplary characters provided according to a user selection or a type of a voice command. Further, FIG. 8 illustrates a graphic user interface having characters which is provided based on analysis results on a voice command or a task result. Such a graphic user interface may include not only characters 810 and 820 but also text messages 920, 921, and 922 related to the voice command and the task result. Furthermore, as shown in FIG. 9, such a graphic user interface may be provided with a character 910 which has a unique facial expression and action according to a voice command and a task result. Such a graphic user interface and characters will be described in detail.

In accordance with at least one embodiment, central server 200 may be a computing system connected to user device 100, speech recognition server 210, AI answering server 220, character generating server 230, and service server 300 through communication network 600. Such central server 200 may be located at a remote place from user device 100. For example, central server 200 is located at a central building (e.g., central office) of a service provider.

Central server 200 may be a computing system including at least one processor, at least one memory, and at least one communication circuit for performing operations for providing artificial intelligence voice interactive services with audio and video feedback based on a voice command. For example, central server 200 may perform operations of receiving a recognized voice command from user device 100, analyzing the received voice command, determining at least one of tasks based on the analysis result, determining whether the determined tasks are an internal task or an external task, performing the determined tasks using service server 300 associated with legacy system, dynamically creating audio and video feedback based on the result of performing the determined task, and transmitting the created audio and video feedback with an associated control signal to user device 100 for selectively outputting the created audio and video feedbacks through various devices around a user. Herein, the external task is a task requiring at least one of service servers 300 to perform necessary operations. The internal task is a task not requiring any of service servers 300 to perform necessary operations of the determined task. That is, the external task may be a service used to be provided by a legacy system.

When central server 200 determines that the requested task is the external task, central server 200 may generate an instruction message in a predetermined standard format based on registration information of a corresponding service server and transmit the generated instruction message to the corresponding service server. Such a format and parameters for the instruction message may be predetermined by at least one of service providers (e.g., system designers, operators, and manufacturer) of central server 200 and service server 300 to cooperate with associated legacy systems. For example, central server 200 may provide a standard message format to various service servers (e.g., vendors) and request service servers to generate a message according to the standard message format in order to communicate to each other and provide a voice interactive interface to non-voice interactive systems. Further, central server 200 may request service servers 300 to upload information about what information is required from a user or a user's vice command to perform to operations (e.g., tasks) for providing legacy services of service servers 300. That is, central server 200 may convert a voice interactive command to a certain format of a message (e.g., instruction message) that can be interpreted by legacy systems or non-voice interactive systems.

For convenience for description and ease of understanding, user device 100 is an independent device from central server 200 in at least one embodiment of the present disclosure. However, the embodiments of the present disclosure are not limited thereto. User device 100 may include all the functions of central server 200, or user device 100 and central server 200 may be implemented as one device in another embodiment of the present disclosure. Configuration and operations of central server 200 will be described in more detail in later with accompanying drawings.

As described, central server 200 may be coupled to, not limited to, speech recognition server 210, artificial intelligent (AI) answering server 220, and character generating server 230 for dynamically generating audio and video feedback in response to the voice command in accordance with at least one embodiment. As described, the audio and video feedback may include an audio based service, a video based service, a user interface (UI) based service, voice commands, sound effects, graphic user interfaces, characters, texts, and animated messages, and so forth. The audio based service may be a service provided based on audio data, such as playing back a radio or a music, reading an electric book, answering with a voice, and so forth. The video based service may be a service provided based on video data, such as reproducing images, playing back movies, music videos, and playing back TV shows, answering with video data, and so forth. The UI based service may be a service provided based on a graphic user interface, such as displaying images and information within a graphic user interface, providing a predetermined graphic user interface for enabling user to control and set at least one of user device 100, central server 200, speech recognition server 210, artificial intelligent (AI) answering server 220, and character generating server 230. For example, in cooperation with user device 100, central server 200, speech recognition server 210, AI answering server 220, and character generating server 230, i) a voice command or a task result may be analyzed to generate at least one of audio feedback and video feedback, ii) determine a service mode (e.g., audio service mode, video based service mode, and UI based service mode), and selectively provide the generated audio feedback and video feedback according to a previous service more and a current service mode; ii) a voice command or a task result may be determined to detect an emotion type, an action type, and a sentence type thereof, a facial expression and an action of a character may be selected based on the emotion type, the action type and the sentence type, a character may be generated based on the selected facial expression and action, and the generated character may be provided; and iii) a provided character may be analyzed to detect an emotion type, an action type, and a sentence type thereof, ii) information on a facial expression and an action may be collected with the detected types, and iii) the collected information may be updated at a character database. Speech recognition server 210, AI answering server 220, and character generating server 230 may be a computing system including at least one communication circuit for communication with other entities through a communication network, at least one memory for storing necessary information for performing a designated operation, and at least one processor for controlling constituent elements thereof and performing the designated operation and communication with other entities.

For example, speech recognition server 210 may perform operations to receive speech data (e.g., voice command) from user device 100 or central server 200 and convert the received speech data to text data in order to recognize a voice command.

AI answering server 220 may analyze a voice command included in the user speech, based on the text data from speech recognition server 210 and collect i) information on a task result from central server 200 or service server 300, ii) state information of user device 100, and iii) context information associated with a user and related environment. Based on the collected information and the analysis result, AI answering server 220 may deduce artificial intelligent answer and generate audio data for voice answers in response to the voice command. AI answering server 220 may request service server 300 to collect or obtain artificial intelligent answer in response to the voice command.

Character generating server 230 may receive the AI answer from AI answering server 220, determines a character type, an emotion type, an action type, and a sentence type based on the AI answer, the voice command, and the user preference information (e.g., user customized), and generates a character based on the determination result of the character type, the emotion type, the action type, and the sentence type. Character generating server 230 may use a character database for determining the character type, the emotion type, the action type, and the sentence type. Further, character generating server 230 may use the character database for generating the character with facial expressions and actions tailored according to the voice command. Character generating server 230 may provide the generated character to central server 200 in order to display the generated character through at least one device (e.g., display unit 504).

Further, character generating server 230 may i) reproduce a character in a reference size, ii) extract emotion, action, and sentence type information from the reproduced character, iii) regenerate tag information of the character, and iv) update the character database. Character generating server 230 may perform such operation of updating the character database after the character is generated and displayed according to the voice command. Character generating server 230 may include a character database for storing information necessary for generating a character based on analysis result of a voice command and updating tag information of each character based on analysis result of a reproduced character.

In accordance with at least one embodiment, service server 300 may be a computing system for performing a task in cooperation with legacy systems for providing a legacy service or a non-voice interactive service in response to a voice command and providing audio and video results of performing the task to at least one of user device 100 and central server 200. For example, service servers 300 may be a non-voice interactive system that does not have functions for recognizing and responding to user speech. For example, service servers 300 may include i) food service server 301 for electrically or digitally ordering foods from existing, typical, and traditional restaurants 310 and physically delivering the ordered foods to a predetermined location, ii) weather service server 302 for requesting weather information to a predetermined organization 320 (e.g., local weather station or broadcasting center) and informing of a user the requested weather information, and iii) transportation service server 303 for electrically or digitally reserving seats of a predetermined transportation and purchasing tickets thereof from a train station or an airport 330. A typical food delivery system (e.g., legacy system) provides a web-page (e.g., typical interface) to a user for ordering a pizza, and the user has to manually fill up the web-page with detail information to order the pizza. Such a legacy system (e.g., typical food delivery system) is not a voice interactive system. That is, such a service server associated with a legacy system does not have an interface cooperating with a voice interactive system. In accordance with at least one embodiment, service servers 300 may be an interface between the voice interactive system (e.g., central service 200) and the legacy system (e.g., legacy systems 310, 320, and 330) to provide various types of services of the legacy system to users without modifying the existing legacy systems. In FIG. 1, legacy systems 310, 320, and 330 are illustrated different and independent systems from service servers 301, 302, and 303. However, the embodiments of the present disclosure are not limited thereto. For example, a service server may be a legacy system. That is, a service server is a non-voice interactive system that provide a service in a typical online manner, for example, requiring a user to manually fill up an associated web-site for providing a certain service.

Meanwhile, user device 100, central server 200 coupled to speech recognition server 210, AI answering server 220, and character generating server 230, and a service server 300 are communicated with each other through communication network 600. Communication network 600 may be any wired and wireless network that digitally connects user device 100, central server 200, a plurality of service servers 300, and smart phone 400 to enable them to digitally communicate to each other. In particular, network 600 may include a local area network (LAN), metropolitan area network (MAN), or wide area network (WAN). As described, communication network 600 between user device 100 and central server 200 may be different from communication network 600 between central server 200 and service servers 300. Further, a communication scheme used between user device 100 and central server 200 may be different from a communication scheme used between central server 200 and service servers 300.

Central server 200 may i) receive a task result from at least one of speech recognition server 210, AI answering server 220, character generating server 230, and service servers 300, ii) generate audio and video feedbacks based on the task result, iii) determine how to selectively provide the audio and video feedback and generate a control signal accordingly, and iv) transmits the generated audio and video feedbacks with the generated control signal in accordance with at least one embodiment.

As described, the artificial intelligence voice interactive system may dynamically create audio and video feedback in response to a voice command and selectively provide various services with the created audio and video feedback in accordance with at least one embodiment. Hereafter, overall operation of the artificial intelligence voice interactive system will be described with reference to FIG. 2.

Figure 2:
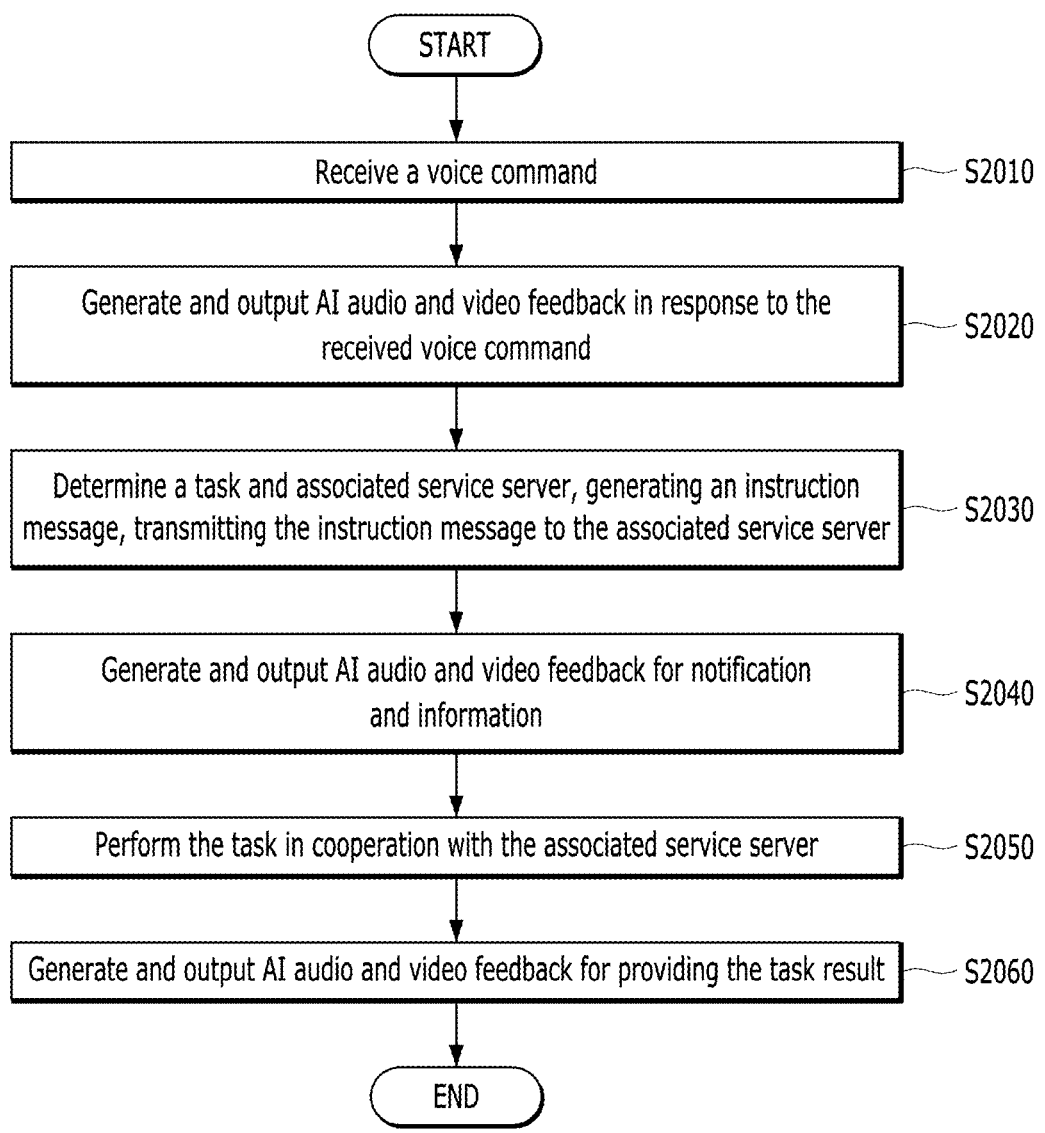
FIG. 2 is a flowchart illustrating overall operation of an artificial intelligence voice interactive system in accordance with at least one embodiment of the present disclosure.

FIG. 2 is a flowchart illustrating overall operation of an artificial intelligence voice interactive system in accordance with at least one embodiment of the present disclosure. Referring to FIG. 2, a voice command may be received from a user at step S2010. For example, after user device 100 is installed and powered on, user device 100 listens speech or sound generated at a predetermined area, recognizes a voice command included in the speech or the sound, generates data corresponding to the voice command, and transmits the generated data to central server 200.

At step S2020, at least one audio and video feedback may be created based on the recognized voice command and outputted through user device 100 and associated output devices (e.g., display). For example, when user device 100 recognizes a wakeup word, user device 100 may transmit a task initiation signal including the recording of the wakeup word to central server 200. Upon generation of such event (e.g., task initiation event, task result receipt event), central server 200 may initiate an audio and video feedback generation operation for generating audio and video feedback. As described above, such an audio and video feedback generation operation will be performed by at least one of speech recognition server 210, AI answering server 220, and character generating server 230. In the audio and video feedback generation operation, i) a feedback mode (e.g., an audio mode, a video mode, and a UI mode) is determined according to a predetermined condition, ii) based on the determined mode, audio data, video data, and UI data may be generated, iii) based on the determined mode, and the generated audio data, video data, and UI data, a control signal may be generated to selectively provide the generated audio data, video data, and UI data. Furthermore, the audio and video feedback generation operation may include an operation for generating a character. Such an operation for generating a character will be described in more detail with reference to FIG. 5 and FIG. 6.

At step S2030, i) at least one task to be performed may be determined, such as an internal task or an external task, and ii) at least one service server to perform the task (e.g., if necessary) may be selected based on the received data. Further, iii) an instruction message may be generated based on the determined task, the selected service server, and registration information of the selected server, and iv) the generated instruction message may be transmitted to the selected service server. For example, central server 200 receives the data including information on the received voice command and supplementary information from user device 100. The data may be audio data that recording speech for a predetermined duration after detecting a wakeup word. The supplementary information may be information on identification of user device 100, identification of a user making speech, a current status of user device 100, a location of user device 100, context information of user device 100 (e.g., collectable information about surroundings of user device 100, such as temperature, pictures, sounds, sending signals, so forth). Central server 200 analyzes the received data, determines at least one task to be performed based on the analysis result, and selects at least one service server based on the determined task if the determined task is an external task requiring one of service servers 300 to perform the task. If the task is an internal task, central server 200 and user device 100 may perform operations related to the determined task without using service servers 300. Central server 200 i) generates an instruction message in a predetermined format compatible with the selected service server based on the determined task, the selected service server, the registration information of the selected service server, and information included in the voice command and ii) transmits the generated instruction message to the selected service server through a communication network. As described, the instruction message may be generated according to formats and parameters included in the registration information of the selected service server. Accordingly, based on the instruction message, service servers 300 may cooperate with legacy systems and provide servers of the legacy systems to the user in response to a voice command although the legacy system cannot be interactive with a voice command.

At step S2040, based on a task type, a required service server, and collected information for determining the task, an audio and video feedback generation operation may be performed at step S2040. For example, upon generation of such event (e.g., task initiation event, a task performing event, task result receipt event), central server 200 may initiate the audio and video feedback generation operation for generating audio and video feedback. In particular, during performing the determined task, a character will be generated using a character database included in the character generating server 230 according to the determined task type, the required service server, and information obtained from the voice command, and the generated character may be outputted through a display unit. As described above, such an audio and video feedback generation operation will be performed by at least one of speech recognition server 210, AI answering server 220, and character generating server 230. The audio and video feedback generation operation including a character generating operation will be described in more detail with reference to FIG. 5 and FIG. 6 and FIG. 20 to FIG. 22.

At step S2050, the determined task may be performed through the selected service server. For example, the selected service server receives the generated instruction message, analyzes the received instruction message, and performs operations to perform the determined task based on the analysis result independently or in cooperation with legacy systems for providing the request services, such as ordering pizzas, checking local weather, purchasing a train ticket, so forth.

At step S2060, an audio and video feedback operation may be performed for providing a result of performing the determined task, as audio and video feedbacks. For example, the selected service server may generate result messages including audio messages and/or video data based on the result of performing the tasks and according to formats and parameters included in the registration information and transmit the generated messages to central server 200. Central server 200 receives the result messages including the audio and video messages from the service server, transmits the result messages including audio and video messages, entirely or partially to user device 100, and directly or indirectly outputs the audio and video messages through at least one associated device including user device 100 (e.g., speakers and displays associated with user device 100). In accordance with another embodiment, service servers 300 may generate and transmit a response message to central server 200 in response to the instruction message. The response message may not include all the information including audio and video data, as a result of performing the determined task. The response message may be an ACK message in response to the instruction message, but the present embodiments are not limited thereto. Furthermore, the result message may not include audio and video messages. In this case, at least one of central server 200 and user device 100 may generate audio and video message based on the information included in the result message. As described above, such an audio and video feedback generation operation will be performed by at least one of speech recognition server 210, AI answering server 220, and character generating server 230. The audio and video feedback generation operation including a character generating operation will be described in more detail with reference to FIG. 5 and FIG. 6 and FIG. 20 to FIG. 22.

As described, the artificial intelligence voice interactive system may provide various types of audio and video feedback in response to a voice command in accordance with at least one embodiment. Hereinafter, detailed operations of each constituent element in the artificial intelligence voice interactive system will be described with reference to the accompanying drawings. At first, detailed operations of use device 100 and central server 200 will be described as follow. User device 100, as described, may recognize a voice command from speech made by a user, transmit the recognized voice command to central server 200, generate audio and video feedback in cooperation to each other, and selectively output the generated audio and video feedback through at least one output device in response to each step of performing a task associated with the voice command in accordance with at least one embodiment. Hereinafter, operations of user device 100 and central server 200 including speech recognition server 210, AI answering server 220, and character generating server 300 will be described in more detail with reference to FIG. 3. For convenience and ease of understanding user device 100 is described as a device dedicatedly designed and manufactured to listen and recognize a voice command without additional user action such as clicking or pushing a predetermined hardware button of the device or touching a predetermined virtual button displayed on a touch screen of the device. However, the embodiments of the present disclosure are not limited thereto. For example, user device 100 may be any devices capable of receiving, recording a voice command, and transmitting data of the voice command to the other entities. For example, as described, and not limited to, user device 100 may be a smart phone, a tablet, a laptop computer, and likes.

Figure 3:
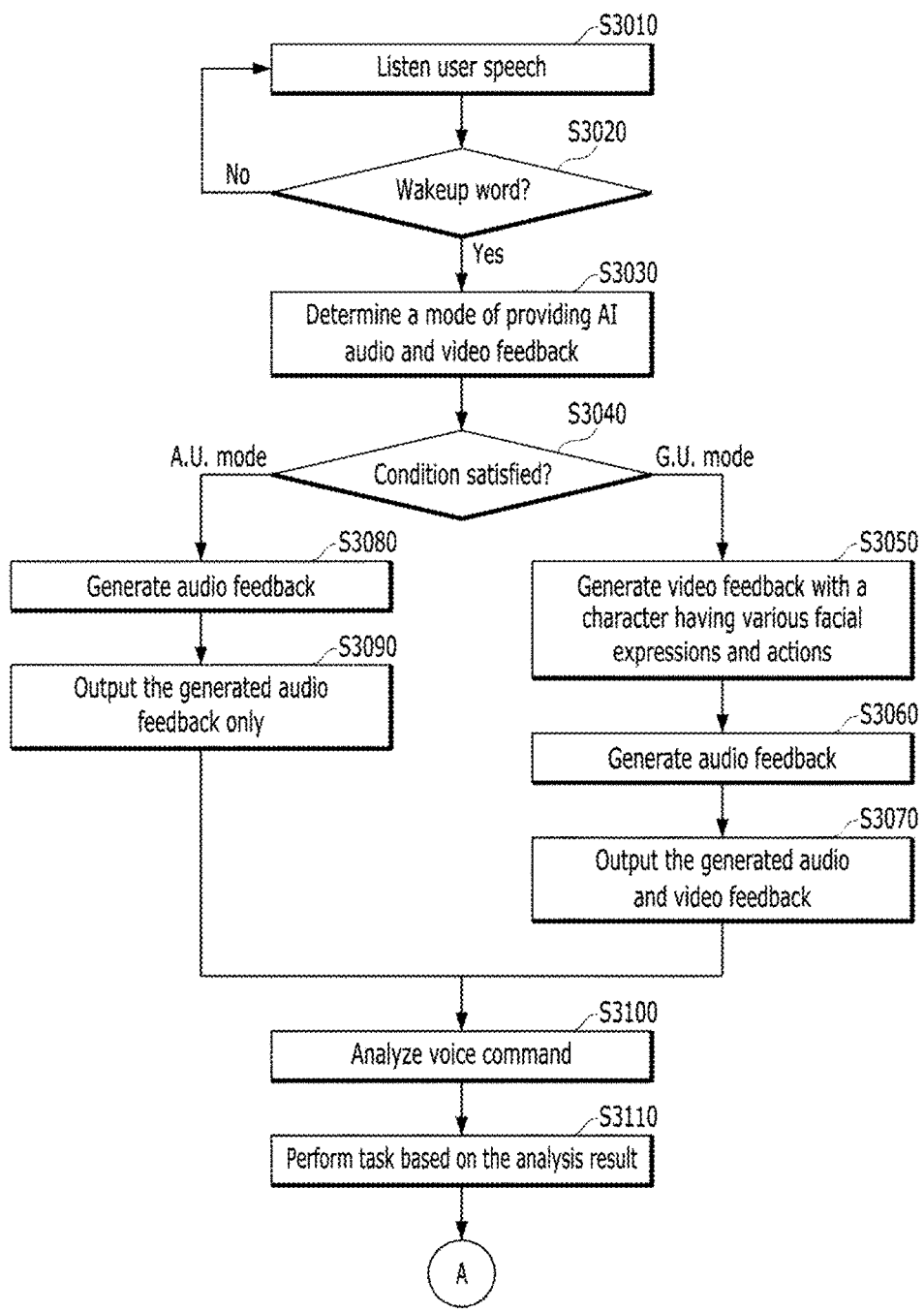
FIG. 3 and FIG. 4 are flowcharts illustrate a method of dynamically providing audio and video feedbacks in response to user speech while providing a task according to a voice command in accordance with at least one embodiment of the present disclosure.
Figure 4:
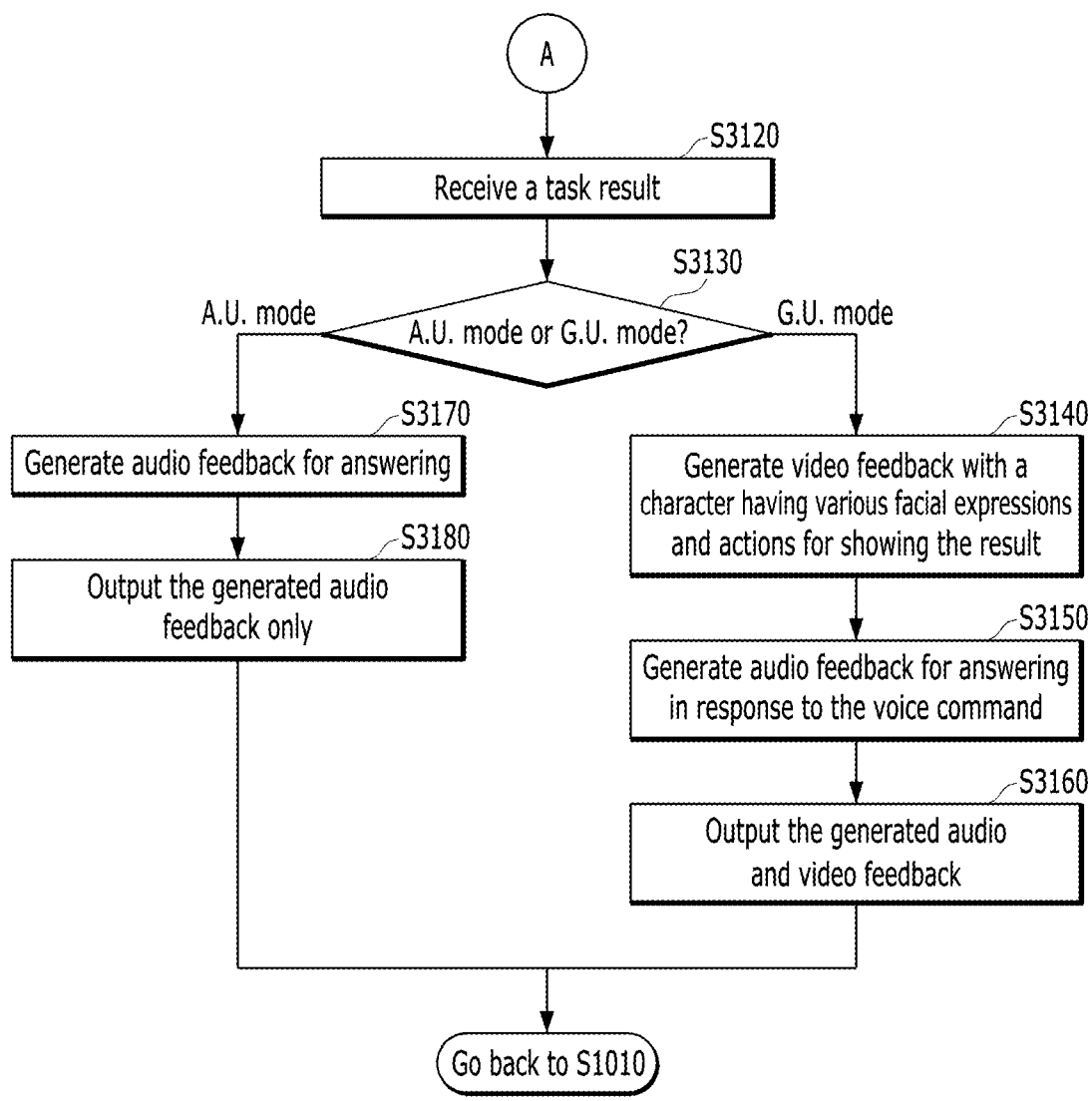

FIG. 3 and FIG. 4 are flowcharts illustrating operation of dynamically providing audio and video feedback in response to a voice command included in a user speech in accordance with at least one embodiment.

Referring to FIG. 3, user device 100 may listen to speech made around user device 100 at step S3010. For example, user device 100 is installed or deployed at a predetermined location (e.g., living room), powered on, connected to communication network 600 (e.g., Internet), and registered at central server 200. Such operations may be performed through a companion application installed at the other device, such as a smart phone 400. For another example, user device 100 may be a battery powered portable device which can be carried with a user. Further, user device 100 may have an interface to enable a user to directly perform setups and register it at central server 200. After powered on, setup, and registration, user device 100 always listens to sound or speech. However, the embodiments of the present disclosure are not limited thereto. For another embodiment, user device 100 may listen to or receive speech (e.g., voice command) upon generation of a predetermined event. The predetermined event may include clicking, pushing, or touching a predetermine button of user device 100. The predetermined button may be a virtual icon displayed on a touch screen (not shown) of user device 100.

At step S3020, user device 100 may determine whether a wake-up is included in the speech or whether a result message is received. That is, user device 100 performs an operation for receiving and recording a voice command (e.g., voice command receiving operation) upon generation of a predetermined event. Such a predetermined event may include recognition of a wake-up word. The wake-up word may be a word (e.g., or sentence) designated as a wake-up word for initiating an artificial intelligence voice interaction task. As a first operation of the artificial intelligence voice interaction task, user device 100 performs the voice command receiving operation. For example, when user device 100 recognizes a wake-up word while listening to speech, user device 100 starts recording speech after the wake-up word for predetermined duration (e.g., 30 seconds). Further, if user device 100 previously determined that user device 100 is in a graphic mode because a display device is coupled to user device 100, user device 100 may generate a graphic user interface with a predetermined character for showing the activation or the read to receive the voice command, so forth.

When user device 100 recognizes a wake-up word (Yes-S3020), user device 100 may determine conditions for invoking a graphic user mode is satisfied at step S3030. For example, user device 100 may be operated in a graphic user mode or an audio user mode. In the graphic user mode, user device 100 may generate, through central server 200, and output i) video feedback including at least one of a video based service, and a graphic user interface with a character having action and facial expression dynamically changed according to at a voice command and ii) audio feedback corresponding to the video feedback. In the audio user mode, user device 100 may generate, through central server 200, and output audio feedback only, such as an audio based service or a voice answer. As described, the audio based service may be a service provided based on audio data, such as playing back a radio or a music, reading an electric book, answering with a voice, and so forth. The video based service may be a service provided based on video data, such as reproducing images, playing back movies, music videos, and playing back TV shows, answering with video data, and so forth. While determining, user device 100 may recognize speech of a certain period time after the wake-up word as a voice command and records the recognized voice command in a predetermined format (e.g., mpeg or way). For another example, user device 100 may recognize speech right after the wake-up word till no sound for about 5 seconds.

When the conditions are satisfied at step S3040 (G.U. mode-S3040), user device 100 may receive, with a predetermined control signal, video feedback data including video data (e.g., video stream, video broadcasting data, moving picture data, for providing the video based service and a graphic user interface including text messages and a character based on the voice command and supplementary information (e.g., performing the audio and video feedback operation) from at least one of central server 200, speech recognition server 210, AI answering server 220, character generating server 230, and service servers 300 step S3050. Alternatively, user device 100 may receive information on the video feedback from at least one of central server 200, speech recognition server 210, AI answering server 220, character generating server 230, and service servers 300 and generate the video feedback based on the received information.

At step S3060, user device 100 may also receive audio feedback data for audio answer, which is matched with the video feedback including video data for the video based service and the graphic user interface with the character at.

At step S3070, user device 100 may selectively output the audio and video feedback through at least one associated device in accordance with the control signal. For example, user device 100 may selectively control at least one of display device 504, and speakers 502 to selectively output the video feedback and the audio feedback through the display device 504 and speakers 502.

When the condition for the graphic user mode is not satisfied (A.U. mode-S3040), user device 100 may receive or generate audio feedback data for audio feedback or voice answer only based on the wake-up word at step S3080, and output the generated audio data through speakers 502 at step S3090.

After outputting such a video and audio feedback at step S3070 or S3090, the voice command may be analyzed at step S3100.

At step S3110, central server 200 may receive at least one voice command extracted from user speech, analysis the at least one voice command, select a service server associated with the task of the at least one voice command based on the analysis result, and perform the task by controlling the selected service server.

Referring to FIG. 4, at step S3120, a result of performing task may be received. At step S3130, user device 100 may determine a current mode is an audio user mode or a graphic user mode. When the current mode is the audio user mode (A.U. mode-S3130), an audio data may be only generated based on the task result by performing the audio and video feedback generation operation at step S3170 and the generated audio data may be output through at least one speaker at step S3180.

When the current mode is the graphic user mode (G.U. mode-S3130), video feedback data may be generated at step S3140 and audio feedback data may be generated based on the task result at step S3150, and the generated video and audio feedback data may be selectively output at least one of display and speakers at step S3170. As described, the video feedback data may include at least one of i) video data generated for providing a video based service as a requested service of the voice command, ii) a graphic user interface data for providing information (text, pictures) related to the task result, and iii) a character data for providing a character having a unique facial expression and actions tailored according to the voice command and the task result. Such a video feedback data may be provided from at least one of central server 200, speech recognition server 210, AI answering server 220, character generating server 230, and service servers 300. Alternatively, user device 100 may i) receive information on the video feedback data from at least one of central server 200, speech recognition server 210, AI answering server 220, character generating server 230, and service servers 300 and ii) generate the video feedback data by itself based on the received information. Further, user device 100 may i) receive a control signal related to the video feedback data from at least one of central server 200, speech recognition server 210, AI answering server 220, character generating server 230, and service servers 300, or ii) generate the control signal by itself, on order to selectively output the video feedback and the audio feedback.

As described above, a graphic user interface with a character is generated upon generation of predetermined events in accordance with at least one embodiment. Such a character may be dynamically generated to have various types of actions and facial expressions based on information on i) a task to be performed, ii) a task result, iii) a type of a voice command, iv) a previous history of generating and providing characters in response to voice commands, and so forth. Hereinafter, such operations of generating a character will be described in detail. That is, a facial expression and an action of a character may be automatically and dynamically determined and provided based on a character type, an emotion type, an action type, and a sentence type of the voice command and the task result. Central server 200 may perform an operation for providing a character in accordance with at least one embodiment. In order to perform such operation, central server 200 may include speech recognition server 210 and conversation server 220. For convenience and ease of understanding, central server 200 is illustrated as including two independent and standalone servers 210 and 220 in FIG. 1. However, the embodiments of the present disclosure are not limited thereto. Central server 200 may be integrally implemented, as one single server, with all functions of speech recognition server 210 and artificial intelligent (AI) answering server 200.

Referring back to FIG. 1, central server 200 may be coupled to, not limited to, speech recognition server 210, artificial intelligent (AI) answering server 220, and character generating server 230 for dynamically generating audio and video feedback in response to the voice command in accordance with at least one embodiment. For example, i) a voice command or a task result may be analyzed to determine an emotion type, an action type, and a sentence type thereof, ii) a facial expression and an action may be selected based on the emotion type, the action type and the sentence type, and iii) a character may be generated based on the selected facial expression and action, and iv) the generated character may be provided.

For example, speech recognition server 210 may receive speech data (e.g., voice command) from user device 100 or central server 200 and convert the received speech data to text data in order to recognize a voice command.

AI answering server 220 may analyze a voice command included in the user speech, based on the text data from speech recognition server 210 and collect i) information on a task result from central server 200 or service server 300, ii) state information of user device 100, and iii) context information associated with a user and related environment. Based on the collected information and the analysis result, AI answering server 220 may deduce artificial intelligent answer and generate audio data for voice answers in response to the voice command.

Character generating server 230 may receive the AI answer from AI answering server 220, determines a character type, an emotion type, an action type, and a sentence type based on the AI answer, the voice command, and the user preference information (e.g., user customized), and generates a character based on the determination result of the character type, the emotion type, the action type, and the sentence type. Character generating server 230 may provide the generated character to central server 200 in order to display the generated character through at least one device (e.g., display unit).

Figure 5:
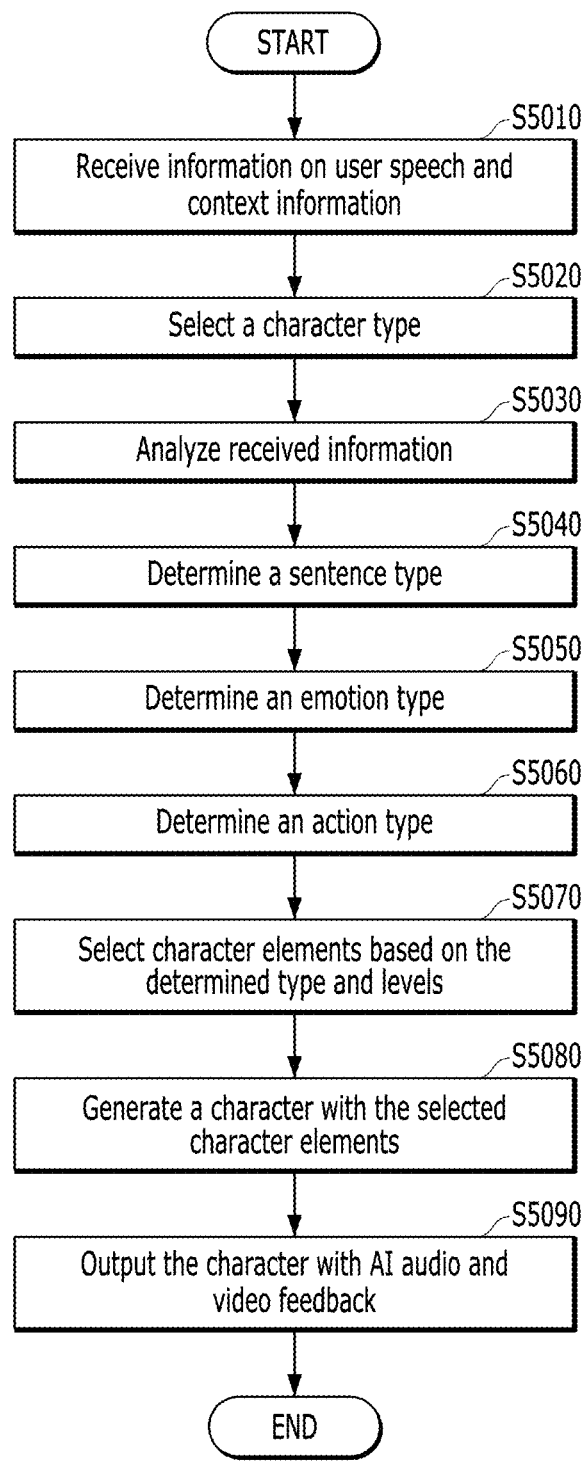
FIG. 5 is a flowchart a method of dynamically creating a character with various facial expressions and actions in response to a voice command in accordance with at least one embodiment of the present disclosure.
Figure 6:
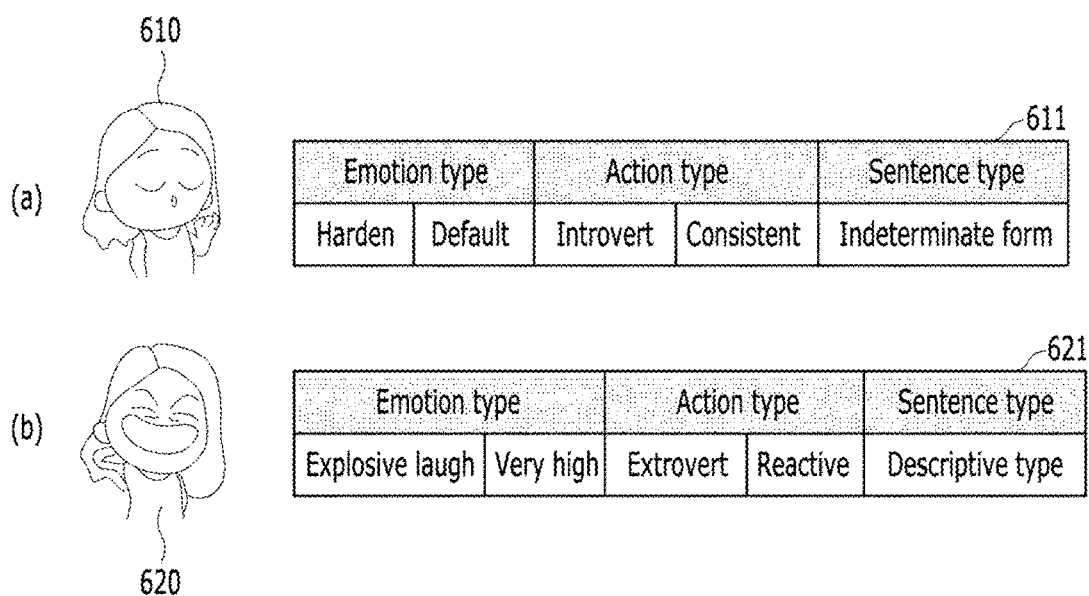
FIG. 6 is a diagram illustrating a character database storing tag information of characters in accordance with at least one embodiment.

FIG. 5 is a flowchart of a method for dynamically generating a character with distinct facial expression and actions in accordance with at least one embodiment. FIG. 6 is a block diagram of a character database and a character generating server in accordance with at least one embodiment.

Figure 11:
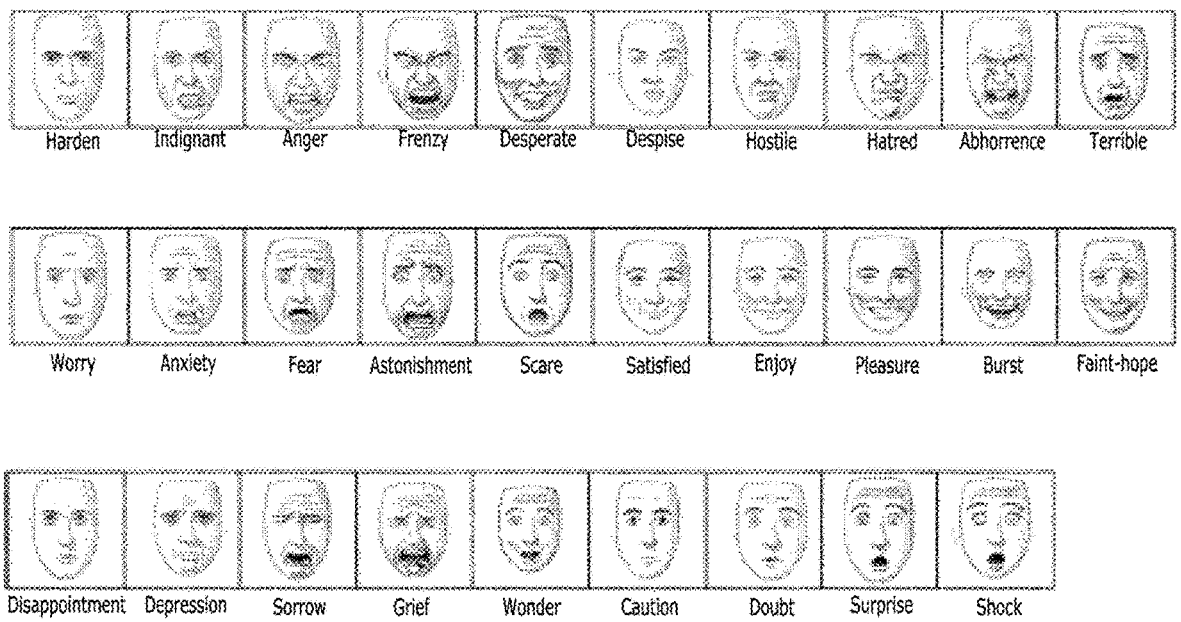
FIG. 11 is a diagram for explaining collecting first emotion information from a character in accordance with one embodiment.

Referring to FIG. 5 and FIG. 6, operations of character generating server 230 will be described in detail. As shown in FIG. 6, character generating server 230 may include a processor configured to perform operations for dynamically creating a character with distinct facial expressions and actions according to a voice command, and a memory configured to store a database for predefined characters, facial expressions, and actions each mapped to the combination of an emotion type, an action type, and a sentence type. For example, as shown in FIG. 6 and FIG. 11, the character database may include a plurality of reference facial expressions each mapped to the combination of a sentence type, and an emotion type. Although it is not shown, the character database further includes a plurality of reference actions each mapped to the combination of a sentence type and a related action type. Such character databases may be predetermined and defined by at least one of a service provider, a system designer, and a user. Further, such databases are updated regularly i) based on a history of generating and providing characters in response to voice commands and ii) based on a reproduced character in a reference size. Accordingly, character generating server 230 may provide more customized characters as time passes.

Referring to FIG. 5, at step S5010, information on a voice command or a task result from at least one of central server 200, user device 100, and service server 300. For example, when user device 100 recognizes a voice command in user speech, user device 100 and central server 200 may provide information on the voice command to at least one of speech recognition server 210, AI answering server 220, and character generating server 230. Further, when central server 200 determines a task to perform based on the voice command, central server 200 may provide information on the determined task to at least one of speech recognition server 210, AI answering server 220, and character generating server 230. Moreover, when service server 300 performs the task and returns a task result, service server 300 may provide information on the task result to at least one of speech recognition server 210, AI answering server 220, and character generating server 230.

At step S5020, a character type may be selected. For example, character generating server 230 may determine the received information (e.g., a type of voice commands, such as an initiation command, an IoT control command . . . ) and determine a character type according to the determination result. FIG. 7 illustrates a database storing characters in accordance with at least one embodiment. As shown, one of the characters may be selected based on the determined result. Such a character type may be selected by a user and stored as registration information. The character type may be differently selected based on weather information, times in a day, a user made an associated voice command, and so forth.

At step S5030, the received information may be analyzed. For example, character generation sever 230 may analyze the received information including a voice command and context information of a user. The received information may be divided into word units, and each word may be analyzed to determine meanings of each word. Based on the analysis results, a sentence type, an emotion type, and an action type may be determined.

At step S5040, a sentence type of the received information may be determined. For example, based on the analysis result, a sentence type of the received information may be determined. The sentence type may include a question sentence, a request sentence, an assertion, an agree, a describe, an admire sentence, and so forth. Such a sentence type may be determined using table 5 below. For example, when a voice command or a task result includes one of classification words in Table 5, the sentence type thereof may be determined as a corresponding tag type.

At step S5050, an emotion type of the received information may be determined. Based on the result of analyzing at least one of a voice command, a task result, and context information, the emotion type may be determined. The emotion type may decide a facial expression or an action of a character. Such an emotion type may be determined based on words included in the voice command, the task result, or the context information of the user. Such an emotion type may be determined using reference facial expressions each mapped to emotion properties, which is stored in the character database. For example, FIG. 11 shows exemplary reference facial expressions each mapped to corresponding emotion properties.

Figure 15:
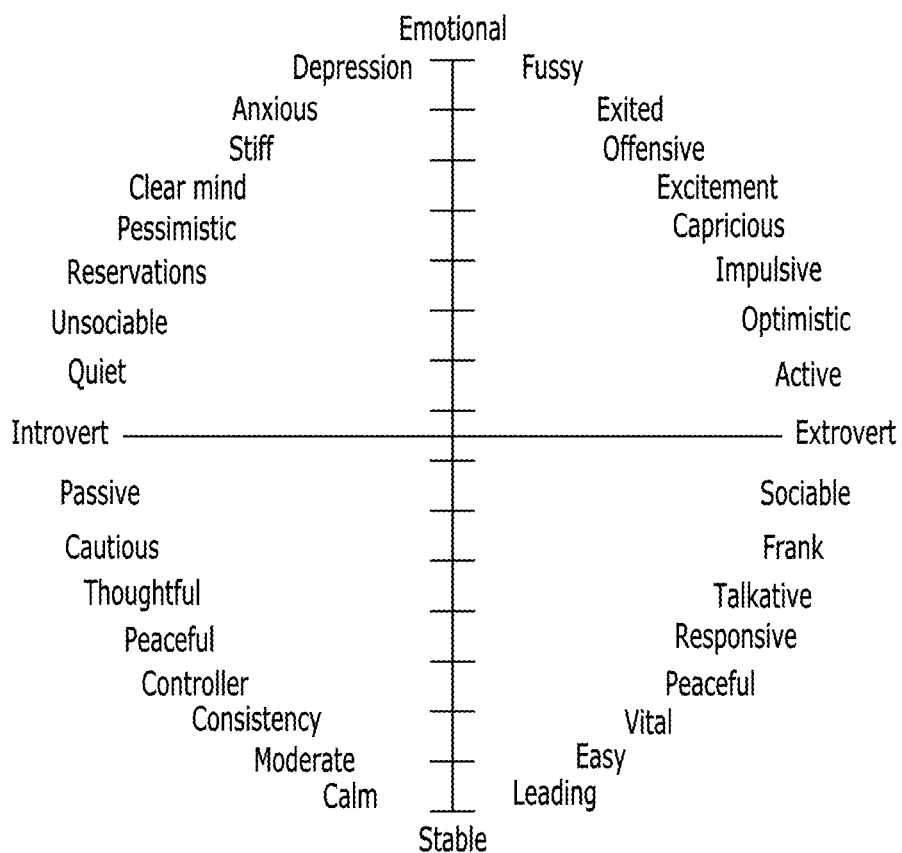

At step S5060, an action type of the received information may be determined based on the analysis result. Based on the result of analyzing at least one of a voice command, a task result, and context information, the action type may be determined. The action type may decide a facial expression or an action of a character to be created. Such an action type may be determined based on words included in the voice command, the task result, or the context information of the user. Such an action type may be determined using an action property chart, which is stored in the character database. For example, FIG. 15 shows an action property chart including various words to determine action types.

At step S5070, tag information may be determined based on the determined sentence type, emotion type, and action type. FIG. 6 illustrates selecting facial expressions and actions based on at least one of a sentence type, an emotion type, and an action type, which are determined based on voice command and a task result, in accordance with at least one embodiment.

At step S5080, a character may be generated based on the tag information. For example, various characters may be dynamically generated as shown in FIG. 11. FIG. 11 illustrates various characters dynamically generated based on tag information.

At step S5090, the generated character may be outputted through at least one device, such as a display. For example, as shown in FIG. 8 and FIG. 9, generated characters may be displayed with a graphic user interfaces. FIG. 8 illustrates exemplary graphic user interfaces displayed as a result of performing a task requested by a voice command in accordance with at least one embodiment, and FIG. 9 illustrates another exemplary graphic user interfaces displayed as a result of performing a task requested by a voice command in accordance with at least one embodiment. The graphic user interface of FIG. 8 includes two characters 810 and 820. Such a graphic user interface of FIG. 8 may be generated and displayed for waiting another instruction (e.g., a voice command) or while performing a task according to a voice command. In FIG. 9, a graphic user interface for setting 920 may include options and corresponding user interfaces for controlling various settings of user device 100. Such a graphic user interface of FIG. 9 may be generated and displayed when a voice command of a user request opening a setting page or a setting interface.

As described, a graphic user interface may include a character, and the character may be automatically generated to have various facial expressions and actions according to emotion information, action information, and sentence type information included in the voice command in accordance with at least one embodiment. Such a generated character may be displayed with a predetermined graphic user interface in accordance with at least one embodiment.

In order to more accurately and dynamically generate a character to have facial expressions and actions tailored to a user (e.g., voice command), previously generated characters may be analyzed, and the analysis result may be accumulated into a character database. In particular, i) the generated and displayed character may be re-analyzed, ii) emotion type, action type, and sentence type may be extracted therefrom, and iii) a character database may be updated based on the extracted information. Since the character database may be updated continuously, character generating server 230 may generate more accurately customized character in response to a user and a voice command in accordance with at least one embodiment of the present disclosure.

Hereinafter, such a method of collecting properties from a character and updating a character database in accordance with at least one embodiment will be described with reference to FIGS. 11 to 19.

Figure 12:
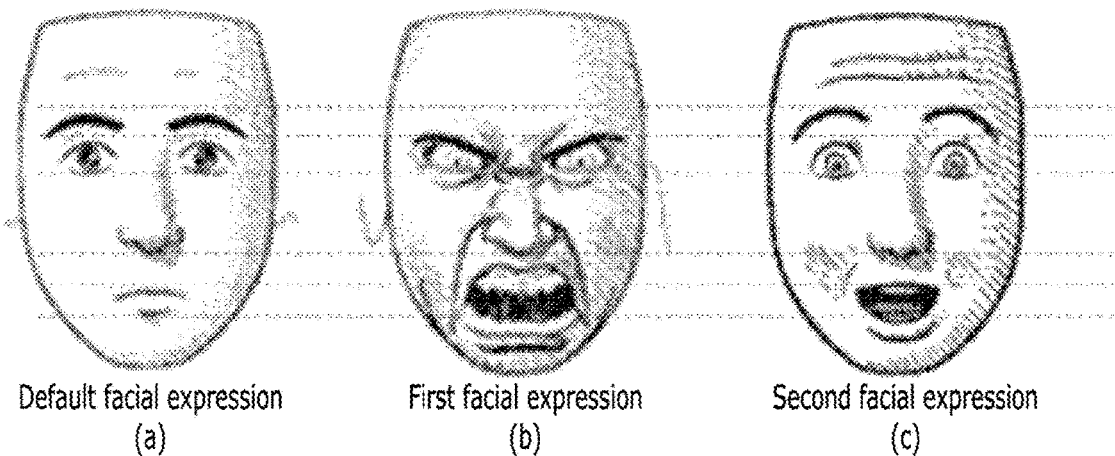
FIG. 12 is a diagram for explaining collecting first emotion information from a character in accordance with another embodiment.
Figure 13:
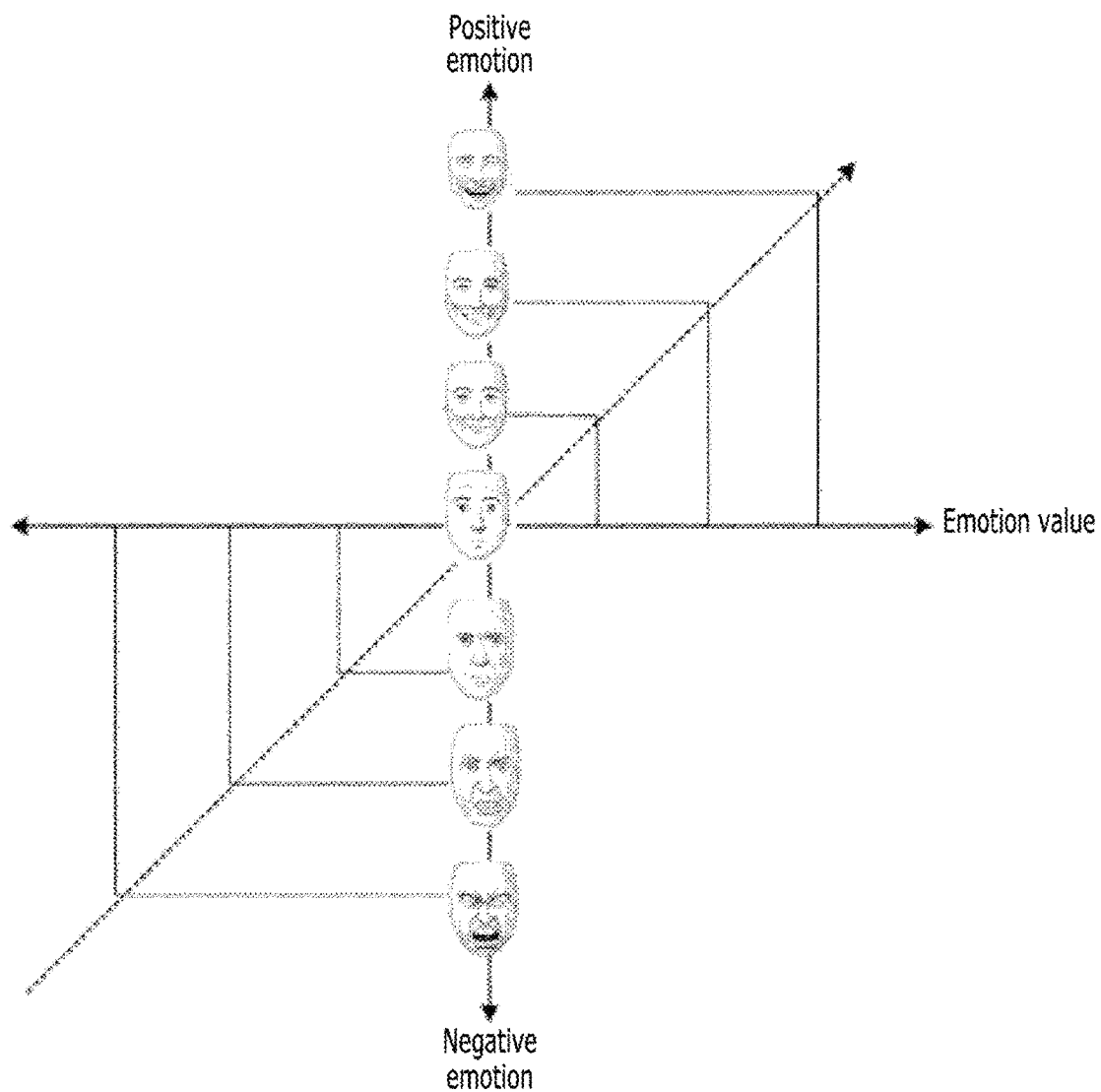
FIG. 13 illustrates exemplary emotion information set according to an emotion value in accordance with at least one embodiment.
Figure 14:
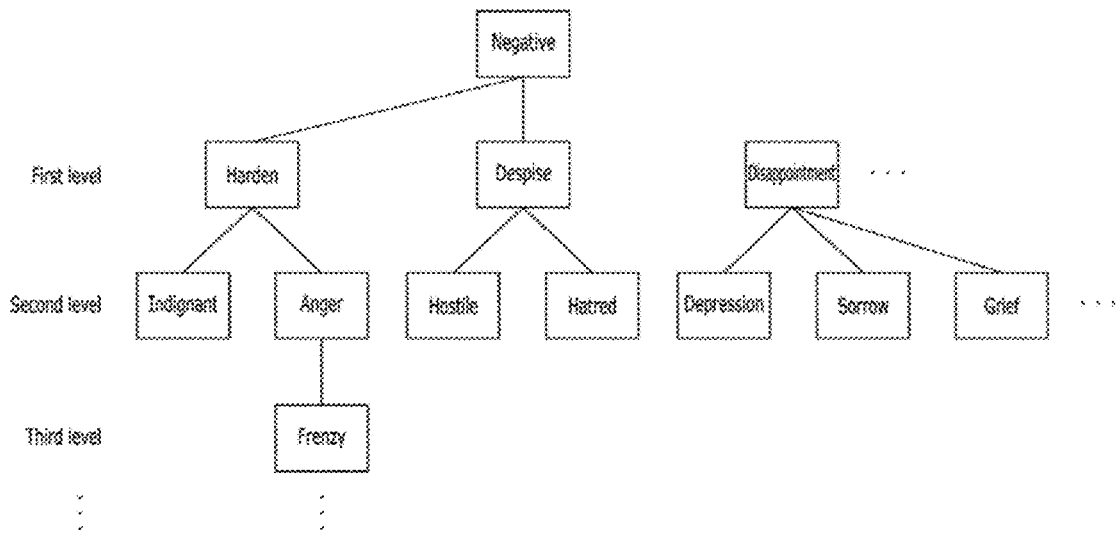
FIG. 14 and FIG. 15 are diagrams for explaining collecting action information from a character in accordance with at least one embodiment.
Figure 16:
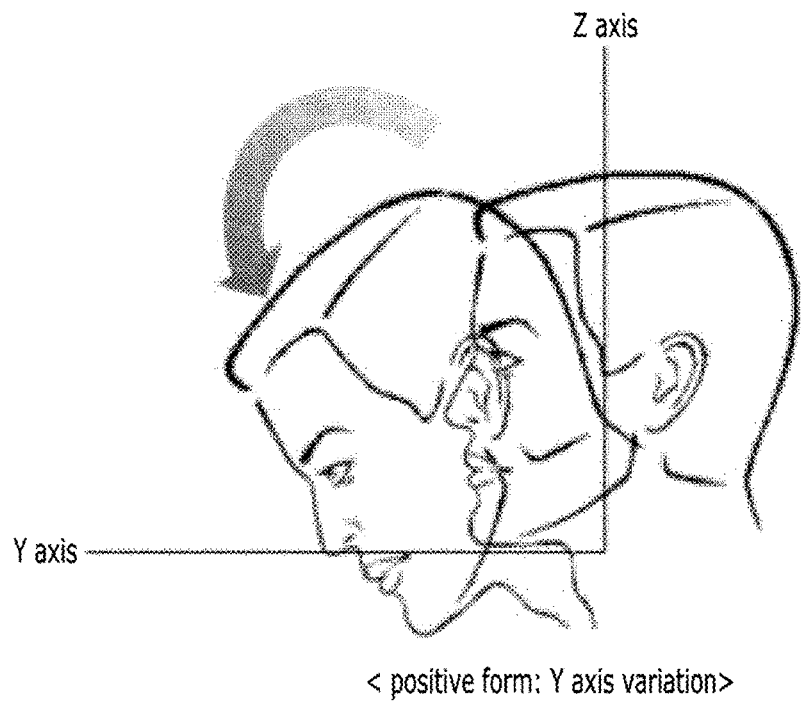
FIG. 16 to FIG. 18 are diagrams for explaining determining a sentence type of a character in accordance with at least one embodiment.
Figure 17:
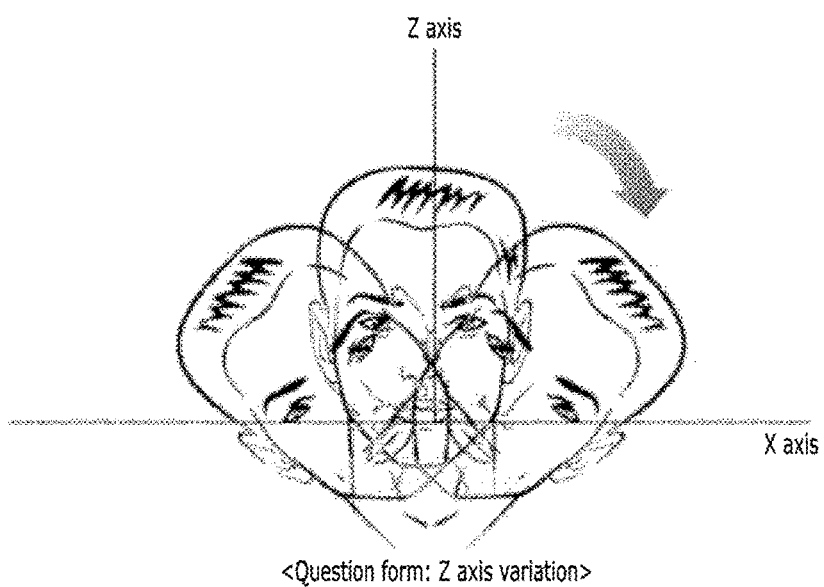
Figure 18:
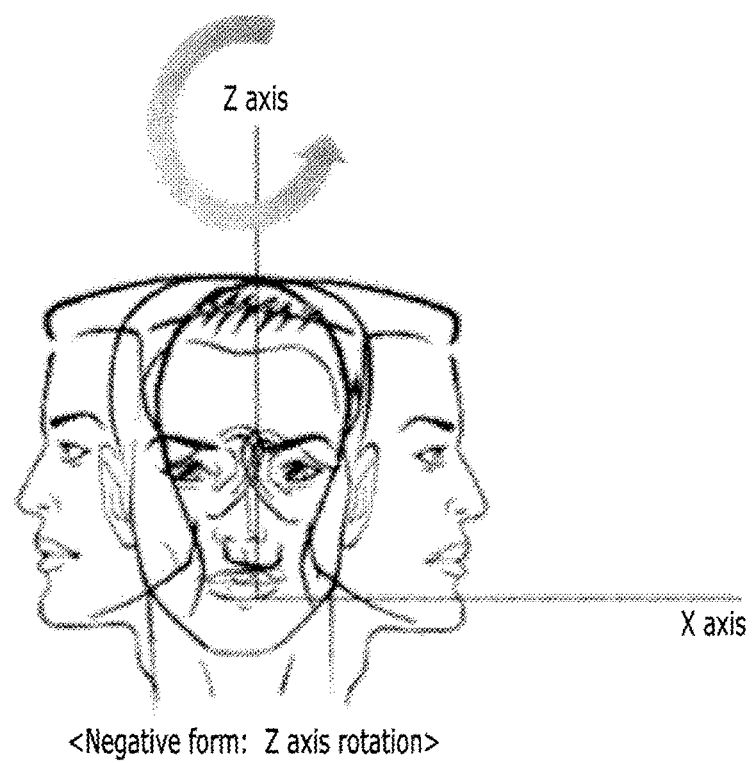
Figure 19:
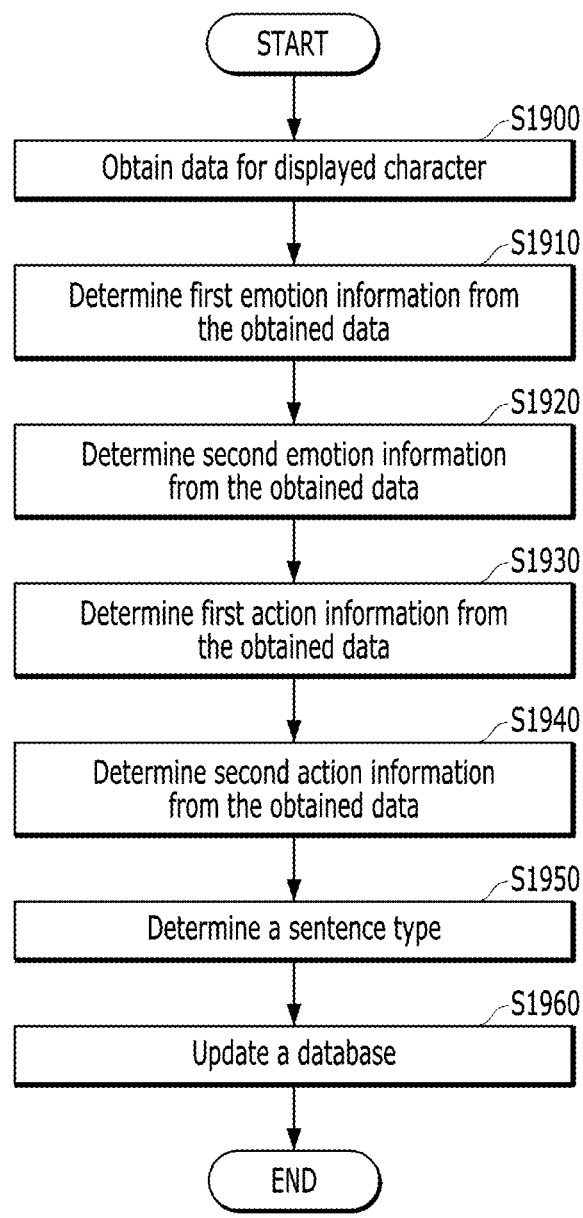
FIG. 19 is a flowchart showing a method for collecting attributes of a character and updating a character database in accordance with at least one embodiment.

FIG. 11 is a diagram for explaining collecting first emotion information from a character in accordance with one embodiment. FIG. 12 is a diagram for explaining collecting first emotion information from a character in accordance with another embodiment. FIG. 13 illustrates exemplary emotion information set according to an emotion value in accordance with at least one embodiment. FIG. 14 and FIG. 15 are diagrams for explaining collecting action information from a character in accordance with at least one embodiment. FIG. 16 to FIG. 18 are diagrams for explaining determining a sentence type of a character in accordance with at least one embodiment. FIG. 19 is a flowchart showing a method for collecting attributes of a character and updating a character database in accordance with at least one embodiment.

Referring to FIG. 19, a data of a character may be obtained at step S1900. At step S1910, first emotion information may be collected from the obtained data. At step S1920, second emotion information may be collected from the obtained data. At step S1930, first action information may be collected from the obtained data. At step S1940, second action information may be collected from the obtained data. At step S1950, a sentence type may be collected from the obtained data. At step S1960, a character database may be updated based on the collected information. Hereinafter, each operation will be described in more detail.

At step S1900, a data of a character may be obtained. For example, character generating server 230 may obtain data of a target character to be analyzed to update the character database. The target character may be previously generated according to emotion, action, and sentence types of a voice command and displayed through at least one display, such as display 504. Such the obtained character data may be digital data produced for displaying the character having a unique facial expression and action, which are determined based on the information on an emotion type, an action type, and a sentence type of the voice command.

From the obtained data of the character, character generating server 230 may reproduce a target character in a reference size, determine a target facial expression and a target action of each body part, and compare the determined target facial expression and the determined target action with a reference facial expression and a reference action using a character database.

As described, character generating server 230 may include a character database for storing associated information in a form of a mapping table. The associated information may include i) emotion reference information (e.g., emotion decision standards) for determining an emotion property in a character, ii) action standard information (e.g., action decision standards) for determining an action property in a character, iii) sentence type standard information for determining a sentence type related to a character, iv) characters (or character elements) each mapped to at least one of emotion properties, action properties, and sentence types.

For example, the emotion reference information may be used for determining (e.g., collecting) emotion properties from a target character according to movement amounts of representative facial parts of a face of the target character. The action standard information may be used for determining action (personality) properties from the target character according to movement amounts of representative body parts of the target character.

In particular, the emotion reference information may be used for extracting (e.g., collecting) emotion properties based on facial expressions of the target character. The emotion reference information may include i) position information of each representative facial part in a reference facial expression (e.g., absence of expression), ii) a weight value of each representative facial part in the reference facial expression, iii) an reference emotion value calculated by adding up all the weight values of the representative facial parts in the reference facial expression, and iv) emotion properties each predetermined and mapped to a corresponding reference emotion value. Herein, the position information may be a position value of each representative facial part in a reference size. For example, FIG. 11 shows exemplary reference facial expressions each mapped to an emotion property, such as harden, indignant, anger, and likes. Although it is not shown, such a reference facial expression may be mapped to a corresponding reference emotion value.

Using the emotion reference information, i) a facial expression (e.g., referred to as a target facial expression) of the target character may be compared with the reference facial expression, ii) a difference between the target facial expression and the reference facial expression may be determined based on the comparison result, and iii) based on the difference, the emotion property of the target facial expression may be determined. For example, FIG. 12 shows that changes in a position of eyebrow. A diagram (a) is a reference facial expression. A diagram (b) is a target facial expression of a target character to be analyzed. The diagram (b) may be a facial expression having an emotion property of anger. A diagram (c) is another exemplary target facial expression showing an emotion property of happy. As shown, the position of eyebrow is different in the diagrams (a), (b), and (c).

The representative facial parts may include eyebrows, eyes, a noise, a mouth, and a chin. However, the embodiments of the present disclosure are not limited thereto. Other facial parts or body parts could be assigned as representative parts for determining emotion information of a target character.

The action reference information may be used to extract (e.g., collect) action properties (e.g., personality information) from actions of the target character. The action reference information may be information for determining a movement amount of each representative body part of the target character. The action reference information may include i) a position value (e.g., information) of each representation body part and ii) a weight value of each representative body part. The position value of each represent body part may be a position value in a reference size.

The representative body parts may include a head, a fingertip, a bellybutton, a knee, and a tiptoe. However, the embodiments of the present disclosure are not limited thereto. The weight value of each representative body part may be differently assigned based on factors of representative body parts, for example, movement frequencies of each body part.

The character database may also store emotion strength information. The emotion strength information may be used to determine strength of an emotion property associated with a target character. The emotion strength information may be defined based on a time of maintaining (sustaining, continuing) a corresponding facial expression.

The character database may further store default emotion properties of characters. Such default emotion properties of characters may be predetermined by at least one of a system designer, a user, and a service provider, and previously stored in a form of a mapping table. Further, such default emotion properties may be mapped to an identification number (e.g., ID) of a corresponding character in one to one manner. For example, FIG. 11 illustrates various facial expressions mapped to emotion properties, respectively.

The character database may also store tag information mapped to each character in one to one manner. For example, FIG. 6 illustrates tag information stored in the character database. The tag information may include characters (e.g., identification number) and corresponding information including emotion type information, action type information, and sentence type information. Such tag information may be continuously updated as a result of analyzing the target character. Further, when target generating server 230 generates a character based on a voice command, target generating server 230 refers the continually updated character database (e.g., tag information). Accordingly, target generating server 230 may generate a character more and accurately customized to a user and a voice command in accordance with at least one embodiment.

As described, character generating server 230 may use the character database to analyze target facial expressions and target actions of the target characters and extract emotion properties including emotion strength properties, action properties, sentence type properties of the target characters based on the emotion reference information and action reference information, which are stored in the character database. Hereinafter, such an operation for analyzing the target character and determining properties will be described in detail.

Referring back to FIG. 19, first emotion information (e.g., emotion properties) may be collected from the obtained data at step S1910, and second emotion information (e.g., emotion strength) may be collected from the obtained data at step S1920. For example, after character generating server 230 reproduces a target character in a reference size, character generating server 230 may determine emotion properties of the target character as follows.

As described above, the character database may store i) reference facial expressions each represents a corresponding emotion property and ii) movement amount values of representative facial parts included in corresponding reference facial expressions. For example, FIG. 11 shows reference facial expressions. Although it is not shown in FIG. 11, each reference facial expression may be mapped to movement amount values of corresponding representative facial parts, such as eyebrow, eyes, noise, mouth, and chin.

If the character database may include the reference facial expressions with movement amount values, character generating server 230 may determine first emotion information and second emotion information of the target character as follows. After character generating server 230 reproduces the target character in a reference size, i) a facial expression of the target character may be compared with reference facial expressions stored in the character database, ii) one having most similar facial expression may be selected from the reference facial expressions based on the comparison result, iii) a movement amount of each representative facial part in the target character may be determined, iv) the determined movement amounts of the representative facial parts may be compared with those in the selected reference facial expression, and v) determination may be made whether the difference therebetween is within a predetermined threshold range.

If the difference is within the predetermined threshold range, the facial expression of the target character may be selected as a reference facial expression for the target character. Then, at least one of emotion properties mapped to the reference facial expression may be determined as the first emotion information of the target character.

If not, character generating server 230 may determine whether there is a reference facial expression having a movement amount value of a representative facial part similar to that of the target character. If there is a reference facial expression satisfying the condition, the satisfied reference facial expression is selected as the first emotion information of the target character. If there is no reference facial expression, the emotion properties of the first-selected reference facial expression (in (ii) above) may be set as the first emotion information of the target character.

After determining (e.g., extracting) the first emotion information from the target character, character generating server 230 may measure a time of maintaining the target facial expression of the target character without changing, set an emotion strength based on the first emotion information based on the measured time, and store the set emotion strength as the second emotion information. To determine the second emotion information, an information table may be previously stored in the character database and used. For example, table 1 below may show emotion strengths according to the maintaining time.

TABLE 1

| Position | Maintaining time | Emotion Strength | Emotion Level |
| --- | --- | --- | --- |
| Very high | S seconds | Very strong | Third level |
| High | 3/S seconds | Strong | Second level |
| Normal | 2/S seconds | Normal | First level |
| Low | 1/S seconds | weak | Natural level |
| Very low | 0 seconds | Very weak | |

* where N is an integer number greater than 0.

For example, character generating server 230 estimates the second emotion information of the input animation character according to the maintaining time of the facial expression of the target character which is determined for the first emotion information.

For example, character generating server 230 determines the first emotion information of the target character is "optimistic," and determines that the target character maintains the facial expression without changing for about 25 to 30 seconds. In this case, character generating server 230 may determine the emotion strength of the target character is "very strong" as the second emotion information.

The determined first emotion information and second emotion information may be stored as parts of the information tag of the target character in the character database, as shown in FIG. 6. For example, when the first emotion information (e.g., emotion property) is "harden," and when the second emotion information (e.g., emotion strength) is "default," the tag of the target character may be stored emotion information tag 611 of FIG. 6.

As described, the character generating server 230 uses the reference facial expressions stored in the character database. However, the character database may not include reference facial expressions (e.g., FIG. 11). In this case, emotion information may be collected as follows.

In accordance with at least one embodiment, the character generating server 230 may use i) a default facial expression (e.g., FIG. 12), ii) N level of emotion strength (e.g., FIG. 13), and iii) hierarchical emotion property chart (e.g., FIG. 14), which are stored in the character database, to determine first emotion information and second emotion information of the target character. For example, the diagram (a) of FIG. 12 shows an exemplary default facial expression. Such a default facial expression may be an absence of expression. However, the embodiments of the present disclosure are not limited thereto. Further, the diagrams (b) and (c) are exemplary facial expressions of target characters, such as an angry facial expression (b), and a happy facial expression (c).

In particular, when the reference facial expressions are not included in the character database, character generating server 230 uses i) the default facial expression, ii) the N levels of emotion strength, and iii) the hierarchical emotion property chart and determine first emotion information and second emotion information as follows.

For example, character generating server 230 may i) identify representative facial parts of the target character, ii) compare positions of the identified representative facial parts with those of the default facial expression stored in the character database (e.g., FIG. 12), iii) calculate movement amounts of the identified representative facial parts based on the comparison result, iv) adding all the calculated movement amounts, v) determine whether the target facial expression is a "positive" expression or a "negative" expression based on the sum of the calculated movement amounts, iv) dividing the sum by N, and iiv) determine first emotion information based on the division result (FIG. 13).

As described, character generating server 230 may determine whether the facial expression of the target character is a positive facial expression or a negative facial expression. Such determination may be made based on the sum of movement amounts of each representative facial part of the target facial expression and the default facial expression.

For example, in order to determine positions of representative facial parts, reference positions of representative facial parts of the default facial expression may be predetermined as shown in dotted lines of FIG. 12. Positions of represent facial parts of the target character may be compared with the reference positions of the representative facial parts of the default facial expression. The representative facial parts may include eyebrows, a mouth, and eyes.

For example, when a position of an eyebrow (e.g., one of representative facial parts) is higher than the corresponding reference position, a position value of the eyebrow is set to be a positive value (e.g., +P). Herein, P is a unit integer number determined by at least one of a system designer, a service provider, and a user. For example, a value of P may be 1. In this case, the position value of the eyebrow is +1. When the position of the eyebrow is lower than the corresponding reference position, the position value (P) is set to be a negative value (-P). In this case, the position value of the eyebrow is -1. Then, all position values of representative facial parts are added up all together. Such a sum of all position value is an emotion value of the target character. When the emotion value is positive, character generating server 230 determines that the target character has positive facial expression.

Further, in order to accurately determine the emotion value, predetermined weight might to apply differently to each facial part. For example, Table 2 shows weights differently assigned to corresponding representative facial parts. A greater value is assigned, as a weight, to a facial part influencing more significantly to a facial expression than others. For example, a noise and a chin do not frequently moves according to a facial expression. When the noise and the chin move, these facial parts significantly influence to the facial expression. Accordingly, the greater values, such as 3 and 5, are assigned to the noise and the chin. Such a weight is multiplied to a position value of each corresponding facial part. For example, when a position value of an eye is -1, a corresponding weight 2 is multiplied to the position value of the eye. Accordingly, the final position value of the eye is -2.

TABLE 2

| Representative facial parts | Weight |
|---|---|
| Eyebrow | 1 |
| Eye | 2 |
| Noise | 3 |
| Mouth | 1 |
| Chin | 5 |

As described, i) weights are applied to corresponding position values of facial parts, ii) final position values of all representative facial parts are added up together, iii) the sum is determined as an emotion value of the target character, iv) when the emotion value of the target character is a positive number, the facial expression of the target character is determined as "positive", and iiv) when the emotion value of the target character is a negative number, the facial expression of the target character is determined as "negative."

After determining "positive" or "negative", character generating server 230 determine the first emotion information of the target character based on the hierarchical emotion property chart (e.g., FIG. 13 and FIG. 14). For example, the reference positive emotion or the reference negative emotion may be divided into N emotion properties, where N is an integer number greater than 0. As shown in FIG. 13, the reference positive emotion and the reference negative emotion each is divided into three emotion properties. For example, the reference negative emotion may be divided into a first emotion property mapped to a first threshold value and emotion property "harden", a second emotion property mapped to a second threshold value and emotion property "despise", and a third emotion property mapped to a third threshold value and emotion property "disappointment." Accordingly, character generating server 230 determines the first emotion information (first emotion property) of the target character as follows: i) comparing the emotion value of the target character with the first, second, and third threshold values, ii) fetching one emotion property based on the comparison result, and iii) determining the fetched emotion property as the first emotion information of the target character.

After determining the first emotion information, second motion information may be extracted. As described, the second emotion information may be emotion strength of the first emotion information. Such emotion strength may be determined by measuring a time of maintaining the target facial expression and determine the emotion strength using the Table 1 above and the hierarchical emotion property chart of FIG. 14.

For example, when the first emotion information of the target character is determined as "harden," and when the target facial expression maintains for 3/S seconds, the second emotion information may be determined as "strong strength" mapped to the second level. Accordingly, the final emotion property of the target character may be one of "indignant" or "Anger."

After collecting the emotion information from the target character, action information (e.g., personality information) may be extracted from the target character. Referring back to FIG. 9, first action information may be collected from the obtained data at step S1940, and second action information may be collected from the obtained data at step S1940.

Similar to the emotion information of the target character, the action information of the target character may be determined based on first action information and second action information. The first action information may be determined based on a position difference value of each representative body part of the target character. The second action information may be determined based on a position difference value of each representative facial part of the target character. Further, the character database may include an action chart for determining the first and second action information of the target character in accordance with at least one embodiment.

For example, FIG. 15 illustrates an exemplary action chart in accordance with at least one embodiment. As shown in FIG. 15, the action information of the target character may be divided into "introvert" and "extrovert" (e.g., first action information: x-axis). Further, the action information may be further divided into "emotional" and "stable" (e.g., second action information: y-axis). Each section (first section between "emotion" and "extrovert", second section between "extrovert" and "stable", third section between "introvert"

and "stable", and fourth section between "introvert" and "emotional") may be divided by n emotion properties, where n is an integer greater than 0, for example, eight. Each emotion property is assigned with unique emotion word, for example of the first section, fussy, excited, offensive, excitement, capricious, impulsive, optimistic, and active.

In order to determine the action information of the target character, character generating server 230 analyzes actions of target character and determines the first action information based on the analysis result. That is, similar to the emotion information, character generating server 230 may i) reproduce the target character in a reference unit size, ii) calculate movement amounts of representative body parts of the target character by comparing the positions of the representative body parts of the target character with those of the reference body parts, iii) apply corresponding weights to the calculated movement amounts of the representative body parts, iv) add all the weight applied movement amounts of the representative body parts, v) determine first action information based on the sum.

Table 3 below shows exemplary weights applied to corresponding representative body parts. As shown, a greater weight is assigned to a body part not frequently moving. Further, a smaller weight is assigned to a body part frequently moving.

TABLE 3

| Representative body parts | Weight |
| --- | --- |
| Head | 3 |
| Fingertip | 1 |
| Valley button | 5 |
| Knee | 3 |
| Tiptoe | 2 |

In accordance with at least one embodiment, character generating server 230 may calculate the movement amount of the representative body part of the target character by comparing positions of the representative body parts with those of the reference body parts in a reference size. For this, the target character may be reproduced in the reference size, and the representative body parts of the reproduced target character are compared with the reference body part. Then, the weights in Table 3 are applied to corresponding movement amounts of the represent body parts. That is, the movement amount of each representative body part may be calculated using an equation below (e.g., Equation 1)

$$\text{Movement amount value} = \Sigma_{T=0}^{x} \text{ position variation of a body part } T \quad \text{Equation 1}$$

Character generating server 230 may calculate an action value of the target character by adding movement amount values of all the representative body parts. When the action value of the target character is greater than a predetermined threshold value, the first action information of the target character is determined as "extrovert." When the action value of the target character is smaller than the predetermined threshold value, the first action information of the target character is determined as "Introvert." Further, the determined first action information may be stored in the character database.

After determining the first action information of the target character, the second action information may be calculated based on the facial expression of the target character. For example, character generating server 230 obtains the second action information based on the weights assigned each representative facial part and the movement amounts of the representative facial parts of the target character. Herein, the weights are shown in Table 2. That is, a facial action value (e.g., the second action information) may be calculated using Equation 2 below.

$$\text{Second action information} = \Sigma_{y=1}^{n} \text{ representative position variation of } y \text{ facial part} \quad \text{Equation 2}$$

In Equation 2, n denotes the number of total representative facial parts, and y denotes an identification number of each representative facial part. The position variation of facial part may be calculated using Equation 3 below.

$$\text{representative position variation of each facial part} = \text{weight } x \Sigma_{T=1}^{x} \text{ position variation of each facial part} \quad \text{Equation 3}$$

In Equation 3, T indicates a time period for accumulating the positions variation, and x is an integer number greater than 0 and predetermined by a system designer. As shown in Equation 2 and Equation 3, character generating server 230 may calculate a representative position variation value of each representative facial part by i) adding position variation values of each representative facial part for a predetermined time period, ii) applying a corresponding weight to the adding result, and iii) calculating a sum, as the facial action value, of all representative facial parts. When the facial action value (e.g., the second action information) is comparatively greater than a predetermined reference value, the target character may be determined to have a more emotional property. When the facial action value (e.g., the second action information) is comparatively smaller than a predetermined reference value, the target character may be determined to have a more stable property.

After the facial action value (e.g., the second action information) is calculated, a corresponding action property may be obtained using an action property chart stored in the character database. As described, the action property chart may include a plurality of action properties each mapped to a corresponding facial action value. For example, the action property chart is divided into "introvert" and "extrovert" in x-axis. The action property chart is further divided into "emotional" and "stable" in y-axis. Each section (first section between "emotion" and "extrovert", second section between "extrovert" and "stable", third section between "introvert" and "stable", and fourth section between "introvert" and "emotional") may be divided by n emotion properties, where n is an integer greater than 0, for example, eight. Each emotion property is assigned with unique emotion word, for example of the first section, fussy, excited, offensive, excitement, capricious, impulsive, optimistic, and active.

In accordance with at least one embodiment, the facial action value may be compared with x thresholds, and a correspond action property is obtained based on the comparison result.

Referring back to FIG. 19 again, after obtaining the first and second action information, sentence type information may be obtained at step S1950. For example, the sentence type information of the target character may be obtained based on a movement direction of a face of the target character. FIG. 16 illustrates detecting a positive form target character, FIG. 17 illustrates detecting a question form target character, and FIG. 18 illustrates detecting a negative form target character.

As shown in FIG. 16, FIG. 17, and FIG. 18, character generating server 230 may i) determine a movement direction based on one of a y-axis, an x-axis, and a z-axis, and ii) select one of a positive form, a question form, a negative form, and a narrative form according to the determined movement direction in accordance with an embodiment.

For example, when the movement direction is detected from the z-axis to the y-axis as shown in FIG. 16, the sentence type is determined as the positive form. When the movement direction is detected from the z-axis to the x-axis as shown in FIG. 17, the sentence type is determined as the question form. When the movement direction is detected as rotation based on the z-axis as shown in FIG. 18, the sentence type is determined as the negative form. When the movement direction is not shown in FIG. 16, FIG. 17, and FIG. 18, the sentence type is determined as the narrative form.

After determining the first emotion information, the second emotion information, the first action information, the second action information, and the sentence type information, a corresponding tag of the target character may be updated in the character database.

Referring back to FIG. 19, a character database may be updated based on the collected information at step S1960. For example, FIG. 6 illustrates a tag of each character stored in the character database. In more detail, Table 4 below shows information stored in the tag of each character.

TABLE 4

| ID | Emotion information | | Action information | | Sentence type |
|---|---|---|---|---|---|
| | First emotion | Second emotion | First action | Second action | |
| A character | Positive | Happy | Extrovert | Exited | Narrative |
| B character | Negative | Tired | Introvert | Stiff | Narrative |
| C character | Negative | Angry | Introvert | Depression | Positive |

Further, table 5 below shows a sentence tag and a value thereof for mapping an action of a character to be provided.

TABLE 5

| Classification | Sentence tag value |
|---|---|
| Request | Request |
| Wh-question | How-Question |
| | What-Question |
| | When-Question |
| | Where-Question |
| | Who-Question |
| | Which-Question |
| | Why-Question |
| Yn Question | Yn-Question |
| Noun | Assert |
| Agree | Agree |
| Reject, negative, cancel | Reject |
| Narrative | Describe |
| Wonder | Admire |
| Etc. | Other |

As described, character generating server 230 generates tag information based on the extracted emotion information, action information, and sentence information and store the tag information mapped to the target characters on one to one manner. The stored tag information may be provided to a user by being mapped to the emotion and action of the character based on the input information when the character is provided based on the input information. Character generating server 230 may automatically generate a character according to input information based on character's property information and tag information stored in memory 310. Such character's property information and tag information may be stored in the character database.

As described, at least one of user device 100, central server 200, speech recognition server 210, AI answering server 220, character generating server 230, and service servers 300 generate or receive information on a result of a task determined in response to a voice command. Based on the task result, at least one of video feedback and audio feedback may be selectively provided to a user according to predetermined conditions. The audio and video feedback may include an audio based service, a video based service, a user interface (UI) based service, voice commands, sound effects, graphic user interfaces, characters, texts, and animated messages, and so forth. The audio based service may be a service provided based on audio data, such as playing back a radio or a music, reading an electric book, answering with a voice, a voice call, and so forth. The video based service may be a service provided based on video data, such as reproducing images, playing back movies, music videos, and playing back TV shows, answering with video data, a video call, and so forth. The UI based service may be a service provided based on a graphic user interface, such as displaying images and information within a graphic user interface, providing a predetermined graphic user interface for enabling user to control and set at least one of properties of user device 100, central server 200, speech recognition server 210, artificial intelligent (AI) answering server 220, and character generating server 230.

In accordance with at least one embodiment, such audio and video feedback are selectively provided to a user according to a task type, a voice command type, a display status, a previous service type, and a current service type, and so forth. The previous service type may be one of a video based service, an audio based service, and a UI based service, performed or currently performing in response to a previous voice command. The current service type may be one of a video based service, an audio based service, and a UI based service, to be performed in response to a current voice command. Hereinafter, a method of selectively provide audio and video feedbacks in response to a voice command in accordance with at least one embodiment will be described with reference to FIG. 20, FIG. 21, and FIG. 22.

Figure 20:
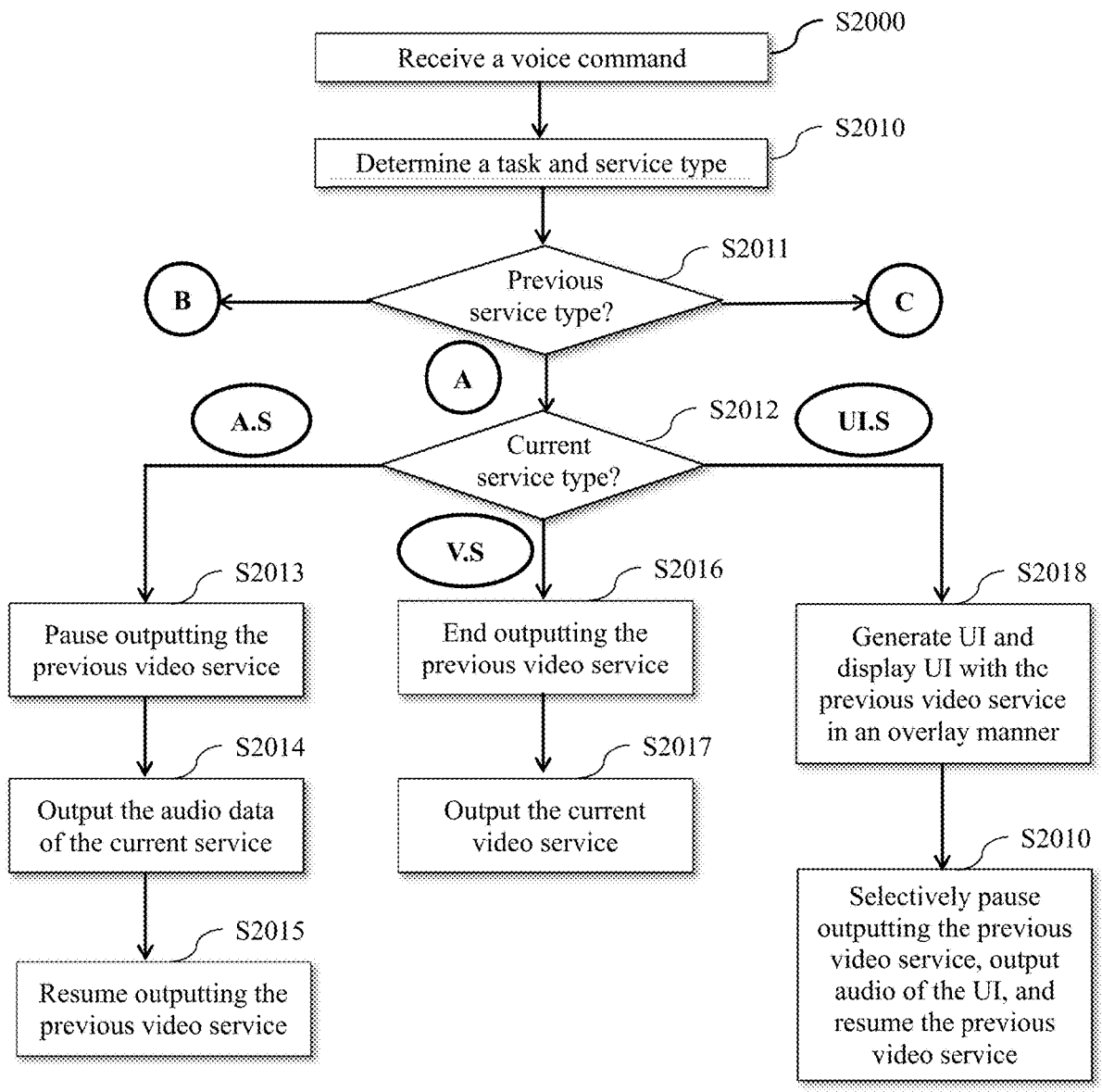
FIG. 20, FIG. 21, and FIG. 22 are flowchart showing a method of dynamically and selectively providing an audio service and a video based service with a user interface (UI) in accordance with at least one embodiment.

FIG. 20 illustrates a method for selectively providing audio and video feedbacks in response to a voice command while providing a video based service as a task result of a previous voice command in accordance with at least one embodiment. Referring to FIG. 20, while providing a video base service through display 504 and speakers 502, user device 100 may recognize a voice command at step S2000. Then, at step S2010, user device 100 may determine an associated task to perform, perform the determined task, and obtain a task result in cooperation with at least one of central server 200, speech recognition server 210, AI answering server 220, character generating server 230, and service server 300. While determining, performing, and obtaining at step S2010, user device 100 may determine whether a current service type (e.g., a service performed or currently performing in response to a previous voice command) is an audio based service, a video based service, and a user interface based service at step S2011.

Herein, the audio based service is a task result only provided through an audio signal, audio data, or an audio device, such as speaker 502. The audio based service may include, not limited to, a voice call service, a music service, a radio service, or an audio answer (e.g., voice answer), an e-book reading service in response to a voice command. The video based service is a task result provided through a video signal, video data, and an audio signal (e.g., optional), audio data, or a video device and an audio device, such as display 504 and speakers 502. The video based service includes a video call, a TV service, a video reproducing service, a home security service, a UI based service, and so forth. The UI based service is a service providing requested information with a predetermined user interface. As described, the UI based service may provide a graphic user interface (GUI) with a character on display 504 in response to a voice command for receiving a voice command, setting devices, showing a task result, and so forth.

When the previous service type is a video based service (A-S2011), user device 100 further determines whether the determined current service type of a task is for a video based service, an audio based service, or a UI based service at step S2012.

When the current task is for the audio based service (A-S2012), user device 100 may control display unit 504 and speakers 502 to pause the outputting the previous video based service (e.g., reproducing a video stream, displaying a TV broadcasting signals) at step S2013. For example, user device 100 may control display 504 and speaker 502 by performing at least one of: i) pausing playing back of the current video based service, ii) reducing a volume of the current video based service but continuing playing back of a video of the current video based service, and iii) muting a volume of the current video based service but continuing playing back of a video of the current video based service. One of three options for controlling the current video based service may be selected based on a user setting, a type of a current video based service (e.g., TV—volume down, Video contents—pausing).

At step S2014, user device 100 may provide the audio based service of the current task through at least of speakers 502. For example, the audio based service of the current task may be a voice answer for a question (e.g., what is weather today? How about traffic?). At step S2015, user device 100 may resume the paused video based service after providing the audio based service of the current task.

Alternatively, user device 100 may control one of speakers 502 to play back the audio data of the current task performed in response to the current voice command and control display unit 504 to continually play back audio data of the previous video based service performed based on the previous voice command. Further, user device 100 may i) control own speakers (not shown) equipped with the user device 100 to play the audio data of the current task performed in response to the current voice command, and ii) control at least one of display 503 and speakers 502 to continually play video and/or audio data of the video based service of the previous voice command. As described, previous audio and video data generated in response to the previous voice command may be simultaneously outputted with current audio and video data generated in response to the current voice command by individually and separately controlling internal speakers (not shown) of user device 100, display unit 504, and speakers 502. For example, the internal speakers of user device 100 may be set to always play back current audio data produced in response to the current voice command while other speakers 502 and display unit 504 play back audio and video data produced in response to the previous voice command or the current voice command. Or, speakers 502 and display unit 504 may be set to continually play back audio and video data of a video base service regardless of a current service type of a current voice command. That is, in accordance with at least one embodiment, audio and video feedback may be selectively provided by controlling speakers 502, internal speakers of user device 100, and display unit 504 individually and separately according to a service type. Such an individual and separate control method may be applied similarly to the following procedures.

When the current task is for the video based service (V-S2012), user device 100 may control display 504 and speaker 502 to stop (end) the currently providing video based service of the previous task result at step S2017. At step S2018, user device 100 may control display 504 and speaker 502 to playback the new video based service of the current task result. In accordance with at least one embodiment, before ending the video based service of the previous task result, user device 100 may ask the user for confirmation.

When the current task is the UI based service (UI-S2012), user device 100 may generate a UI according to the current voice command in a predetermined displayable form and display the generated UI with the currently providing video based service in an overlay manner at step S2018. User device 100 may generate an audio data according to the generated UI and play the generated audio data as follows: i) reducing a volume of the currently providing video based service while the playing the generated audio data, ii) muting the volume of the currently providing video based service while the playing the generated audio data. In another embodiment, the audio data may not be played according to a user preference or a user customized setting.

Figure 21:
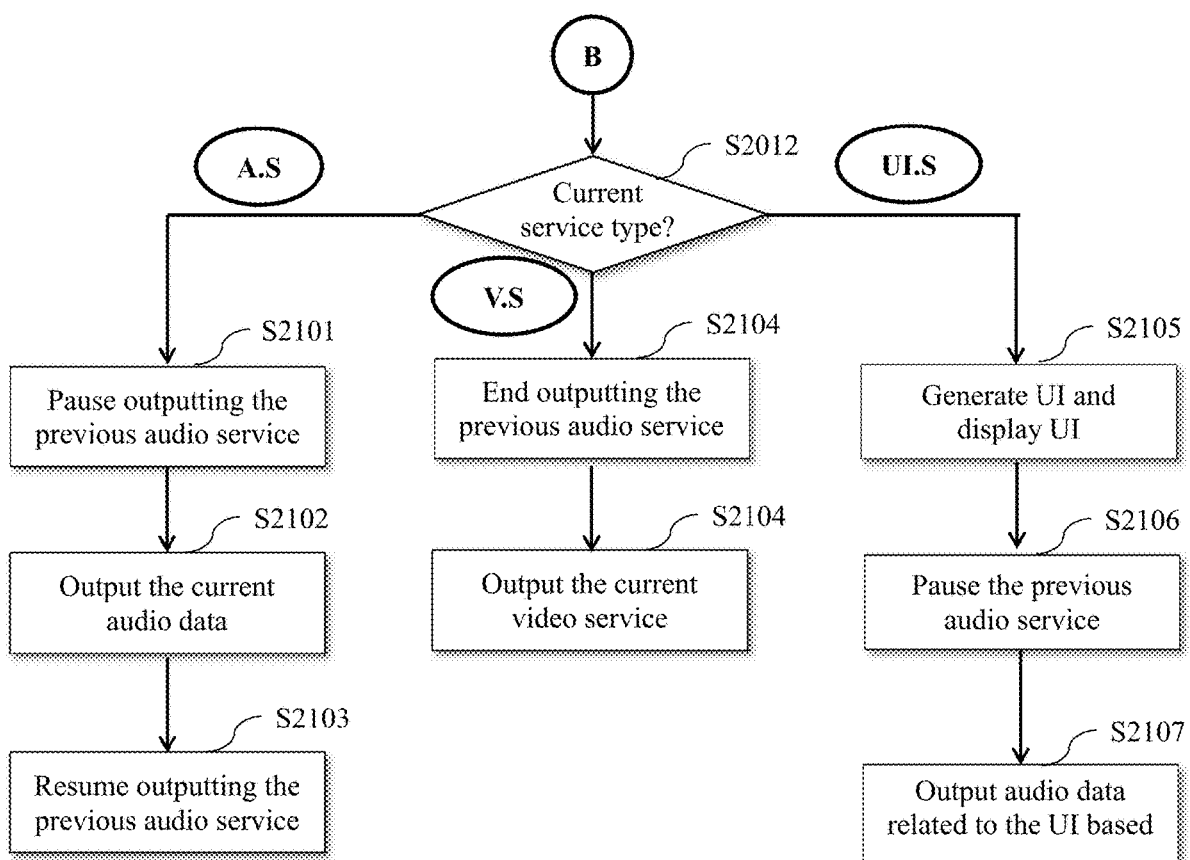

FIG. 21 illustrates a method for selective providing audio and video feedbacks in response to a voice command while providing an audio based service as a task result of a previous voice command in accordance with at least one embodiment. Referring to FIG. 21, when the currently providing service is an audio based service (a-S2011), user device 100 further determines whether the determined current task is for a video based service, an audio based service, or a UI based service at step S2012.

When the current task is for the audio based service (A-S2012), user device 100 may control speaker 502 to pause the current audio based service (e.g., reproducing music or voice answer to a previous voice command) at step S2101. At step S2102, user device 100 may provide the audio based service of the current task through at least of speakers 502. For example, the audio based service of the current task may be a voice answer for a question (e.g., what is weather today? How about traffic?). At step S2103, user device 100 may resume the paused audio based service after providing the audio based service of the current task.

When the current task is for the video based service (V-S2012), user device 100 may control speaker 502 to stop (end) the currently providing audio based service of the previous task result at step S2104. At step S2105, user device 100 may control display 504 and speaker 502 to playback the new video based service of the current task result. In accordance with at least one embodiment, before ending the video based service of the previous task result, user device 100 may ask the user for confirmation.

When the current task is the UI based service (UI-S2012), user device 100 may generate a UI according to the current voice command in a predetermined displayable form and display the generated UI with the currently providing audio based service at step S2106. User device 100 may generate an audio data according to the generated UI and play the generated audio data at step S2108. In this case, user device 100 may stop the playing of the previous audio based service at step S2107. If no audio data is generated corresponding to the generated UI, operations S2107 and S2108 may be omitted.

Figure 22:
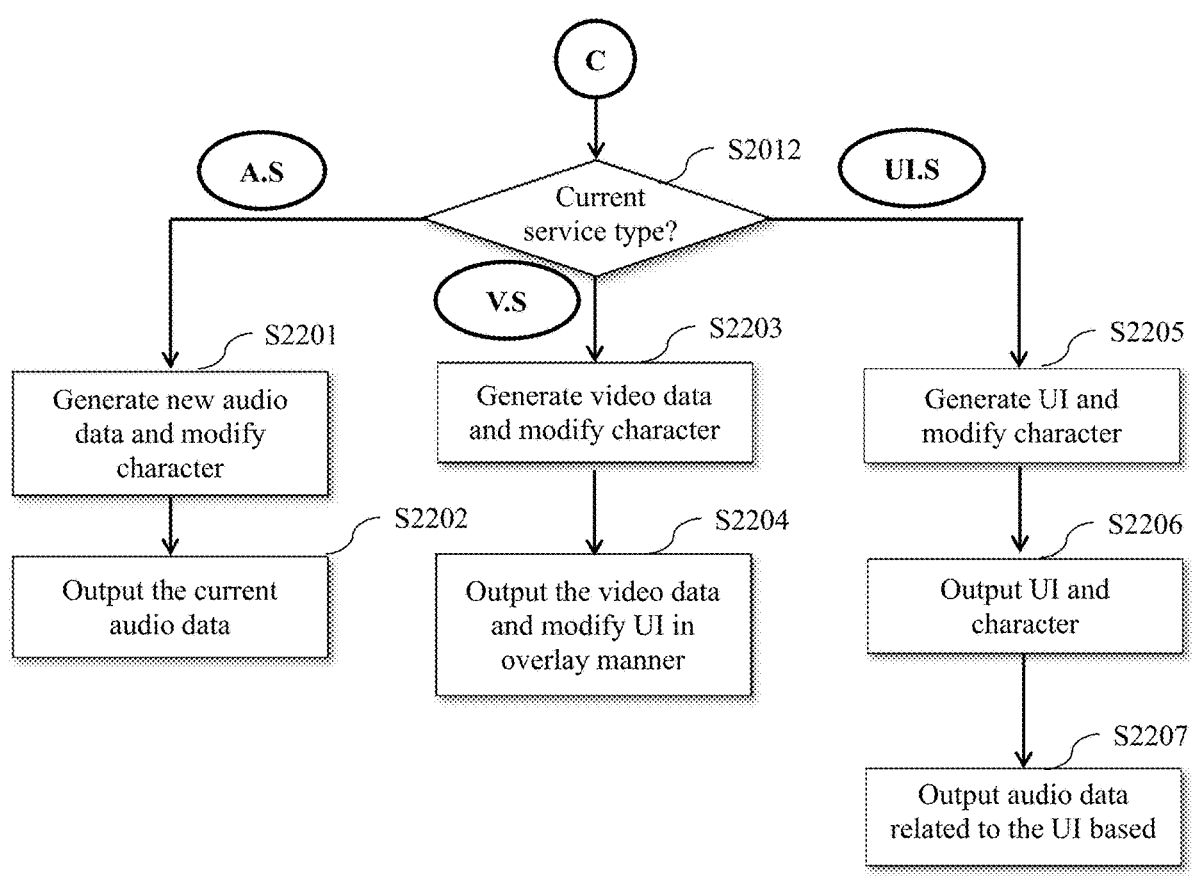

FIG. 22 illustrates a method for selective providing audio and video feedbacks in response to a voice command while providing a user interface (UI) service as a task result of a previous voice command in accordance with at least one embodiment. Referring to FIG. 22, when the currently providing service is a UI based service (UI-S2011), user device 100 further determines whether the determined current task is for a video based service, an audio based service, or a UI based service at step S2012.

When the current task is for an audio based service (A-S2012), user device 100 may generate an audio data in response to the determined audio based service, modify at least one of a character, a facial expression, and an action based on the generated audio data, and displaying the modified one with the previous UI based service at step S2201. At step S2202, user device 100 may provide the audio based service of the current task through at least of speakers 502.

When the current task is for the video based service (V-S2012), user device 100 may generate a video and audio data according to the current video based service and modify at least one of a character, a facial expression, and an action in the currently providing UI based service based on the generated video and audio data at step S2203, At step S2204, user device 100 may display the generated video data with the previous providing UI based service and the modified character in an overlay manner, and output the generated audio data through at least one speaker 502.

When the current task is for another UI based service (UI-S2012), user device 100 may generate a UI according to the current voice command in a predetermined displayable form and modify at least one of a character, a facial expression, and an action based on the generated UI at step S2205. At step S2206, user device 100 may display the newly generated UI with the modified character. User device 100 may generate an audio data according to the generated UI and play the generated audio data.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for dynamically providing audio and video feedback in response to a voice command through an artificial intelligence voice interactive system including a user device, a central server, a speech recognition server, an artificial intelligent answering server, and a character generating server, the method comprising:

receiving a user speech through the user device;

recognizing a voice command in the user speech by the central server and the speech recognition server;

analyzing, by the central server and the artificial intelligent answering server, the voice command and associated context information, determining whether a service type to be provided is an audio service, a video based service, or a user interface service based on the analysis result, and generating an audio data and video data by i) reproducing audio or video contents, ii) generating a graphic user interfaced with a character, iii) receiving a broadcasting signal from an external entity according to the determined service type;

determining a mode of providing the audio data and the video data based on a predetermined mode condition including detecting a signal indicating that the display unit is coupled to the user device; and selectively outputting the audio data and the video data through at least one of a display device and a speaker coupled to the user device based on the determined mode, wherein the graphic user interface includes at least one of menus, images and texts for enabling users to control and set one of the user device, the central server, the speech recognition server, the artificial intelligent answering server, and the character generating server, and wherein the character includes a facial expression and an action tailored based on the analysis result of the voice command and associated context information using a character database repeatedly updated with previously reproduced character, wherein the selectively outputting comprises:

when a service type associated with the voice command is the audio service while outputting a video data in response to a previous voice command, consecutively performing:

i) generating a new audio data in response to the voice command;

ii) pausing the outputting of the video data of the previous voice command;

iii) playing back the new audio data; and iv) resuming the outputting of the video data of the previous voice command.

2. The method of claim 1, wherein the generating comprises:

generating the graphic user interface with the character as the video data upon receipt of the voice command; and displaying the generated graphic user interface with the character through the display device.

3. The method of claim 1, wherein the generating comprises:

selectively outputting the generated audio data and the generated video data through at least one of a display device and a speaker coupled to the user device according to the service type determined based on the voice command.

4. The method of claim 1, wherein the selectively outputting comprises:

differently and selectively outputting the generated audio data and the video data according to the determined service type.

5. The method of claim 1, wherein the selectively outputting comprises:

when a service type of the voice command is the video based service, outputting both of the generated audio data and the generated video data through the display and the speaker;

when a service type of the voice command is the audio service, outputting the generated audio data through the speaker; and when a service type of the voice command is the user interface (UI) service, generating, as the video data, the graphic user interface with the character for interacting with a user and displaying the generated graphic user interface with the character through the display device.

6. The method of claim 1, wherein the selectively outputting comprises:

displaying the generated video data of the voice command while displaying previously generated video data of a previous voice command in an overlapping manner.

7. The method of claim 1, wherein the selectively outputting comprises:

when a service type associated with the voice command is the audio service while outputting a video data in response to a previous voice command, performing at least one of:

i) generating a new audio data in response to the voice command;

ii) continuing the outputting of the video data of the previous voice command;

iii) muting a volume of the outputting of the video data of the previous voice command;

iv) playing back the new audio data; and v) resuming the volume of the outputting of the video data of the previous voice command.

8. The method of claim 1, wherein the selectively outputting comprises:

when a service type associated with the voice command is the user interface (UI) service while outputting a video data in response to a previous voice command, performing at least one of:

i) generating the graphic user interface with the character in response to the voice command; and ii) outputting the graphic user interface with the character over the outputted video data of the previous voice command in an overlapping manner.

9. The method of claim 8, further comprising:

iii) generating an audio data corresponding to the generated the graphic user interface with the character in response to the voice command;

iv) pausing a volume of the outputting of the video data of the previous voice command;

v) outputting the generated audio data; and vi) resuming the volume of the outputting of the video data of the previous voice command after completely outputting the generated audio data.

10. The method of claim 1, further comprising:

in case of a graphic user mode, outputting both of the audio data and the video data in response to the voice command; and in case of an audio user mode, outputting the audio data only in response to the voice command.

11. The method of claim 10, wherein the predetermined mode condition for selecting the graphic user mode includes:—
  determining that the graphic user mode is previously selected by a user;
  receiving a voice command requiring a video service; and
  receiving a task result requiring a video service.

12. The method of claim 1, further comprising:
  selectively outputting the generated character according to the analysis result.

13. The method of claim 12, wherein the generating includes:
  determining at least one of a sentence type, an emotion type, and an action type of a character to be generated based on the analysis result.

14. The method of claim 12, wherein the generating includes:
  generating the facial expression and the action of the character based on a sentence type, an emotion type, and an action type, which are determined based on the analysis result.

15. The method of claim 1, wherein the generating includes:
  selecting at least one of character elements based on at least one of a sentence type, an emotion type, and an action type, which are determined based on the analysis result; and
  generating the character by combining the selected at least one of character elements.

16. The method of claim 15, wherein the at least one of character elements is selected from the character database having reference facial expressions and reference actions, which are classified by and mapped to at least one of sentence types, emotion types, and action types.

17. The method of claim 10, further comprising:
  reproducing the generated character with the facial expression and the action in a reference size;
  collecting emotion information, action information, and sentence type information from the reproduced character; and
  updating the character database by storing tag information of the reproduced character to include the collected emotion information, action information, and sentence type information.

18. A method for dynamically providing audio and video feedback in response to a voice command through an artificial intelligence voice interactive system, the method comprising:
  generating an audio data for an audio service, a video data for a video based service, and a user interface (UI) data for a UI based service in response to a voice command;
  determining a mode of providing the audio data and the video data based on a predetermined mode condition including detecting a signal indicating that a display unit is coupled to the user device, or not internally included or externally coupled to the user device;
  selectively outputting the generated audio data, the video data, and the UI data according to a service type determined based on the voice command and associated context information and the determined mode,
  wherein the UI data includes data for a graphic user interface and a character having a facial expression and an action, which are tailored based on the voice command and the associated context information using a character database repeatedly updated with previously reproduced character, and
  wherein the graphic user interface includes at least one of menus, images and texts for enabling users to control and set one of a user device, a central server, a speech recognition server, an artificial intelligent answering server, and a character generating server,
  wherein the selectively outputting comprises:
  when a service type associated with the voice command is the user interface (UI) service while outputting a video data in response to a previous voice command, consecutively performing:
  i) generating the graphic user interface with the character in response to the voice command;
  ii) outputting the graphic user interface with the character over the outputted video data of the previous voice command in an overlapping manner;
  iii) generating an audio data corresponding to the generated the graphic user interface with the character in response to the voice command;
  iv) pausing a volume of the outputting of the video data of the previous voice command;
  v) outputting the generated audio data; and
  vi) resuming the volume of the outputting of the video data of the previous voice command after completely outputting the generated audio data.

19. The method of claim 18, further comprising:
  after the selectively outputting, analyzing the generated character by reproducing the generated character in a reference size, and updating the character database with the analyzing result,
  wherein the character database is used to dynamically generate the character to have different facial expression and actions according to the voice command and the associated context information.

* * * * *